US012653266B2

(12) United States Patent
Beers et al.

(10) Patent No.: US 12,653,266 B2
(45) Date of Patent: **\*Jun. 16, 2026**

(54) SENSOR FOR AN ARTICLE OF FOOTWEAR

(71) Applicant: NIKE, Inc., Beaverton, OR (US)

(72) Inventors: Tiffany A. Beers, Portland, OR (US);
Andrew A. Owings, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 251 days.

This patent is subject to a terminal disclaimer.

(21) Appl. No.: 18/369,533

(22) Filed: Sep. 18, 2023

(65) Prior Publication Data

US 2024/0156203 A1      May 16, 2024

Related U.S. Application Data

(60) Continuation of application No. 17/388,274, filed on Jul. 29, 2021, now Pat. No. 11,758,969, which is a
(Continued)

(51) Int. Cl.
*A43B 3/44*          (2022.01)
*A43B 3/34*          (2022.01)
(Continued)

(52) U.S. Cl.
CPC .................. *A43B 3/44* (2022.01); *A43B 3/34* (2022.01); *A43C 11/008* (2013.01);
(Continued)

(58) Field of Classification Search
CPC .... A43B 3/34; A43B 3/44; A43B 5/00; A43C 11/008; A43C 11/165; A61B 5/1038;
(Continued)

(56) References Cited

U.S. PATENT DOCUMENTS

| | | | |
|---|---|---|---|
| 1,668,706 A | 5/1928 | Wood | |
| 1,722,579 A | 7/1929 | Johnson | |
| | (Continued) | | |

FOREIGN PATENT DOCUMENTS

| | | | | |
|---|---|---|---|---|
| CN | 103476284 B | * 11/2015 | ............. | A43B 7/144 |
| EP | 3429389 | 8/2020 | | |
| | (Continued) | | | |

OTHER PUBLICATIONS

"International Application Serial No. PCT US2017 022579, International Search Report mailed Jun. 28, 2017", 3 pgs.
(Continued)

*Primary Examiner* — Octavia Hollington
(74) *Attorney, Agent, or Firm* — Quinn IP Law

(57)          ABSTRACT

An article of footwear or an article of apparel can include provisions for facilitating the use of a sensor device and protecting the sensor device from external particles or fluid. The sensor device can include a conduit for moving air through the sensor device from one portion of the sensor device to another portion of the sensor device. An elastic membrane can be attached to an opening formed in the sensor device. The elastic membrane can deform in response to changes in air pressure within the sensor device.

20 Claims, 14 Drawing Sheets

Related U.S. Application Data continuation of application No. 16/687,066, filed on Nov. 18, 2019, now Pat. No. 11,076,655, which is a continuation of application No. 16/212,175, filed on Dec. 6, 2018, now Pat. No. 10,617,169, which is a division of application No. 15/070,084, filed on Mar. 15, 2016, now Pat. No. 10,188,169.

(51) Int. Cl.

| | | |
|---|---|---|
| *A43C 11/00* | (2006.01) | |
| *A43C 11/16* | (2006.01) | |
| *G01L 1/18* | (2006.01) | |
| *G01L 1/20* | (2006.01) | |
| *G01L 5/00* | (2006.01) | |

(52) U.S. Cl.
CPC .............. *A43C 11/165* (2013.01); *G01L 1/20* (2013.01); *G01L 5/00* (2013.01); *G01L 1/18* (2013.01)

(58) Field of Classification Search
CPC .......... A61B 5/6807; G01L 1/18; G01L 1/20; G01L 5/00
See application file for complete search history.

(56) References Cited

U.S. PATENT DOCUMENTS

| | | | |
|---|---|---|---|
| 5,357,696 A | 10/1994 | Gray et al. | |
| 5,878,378 A | 3/1999 | Brommer et al. | |
| 6,086,064 A | 7/2000 | Biegelsen et al. | |
| 7,607,359 B2 | 10/2009 | Hecht et al. | |
| 8,056,269 B2 | 11/2011 | Beers et al. | |
| 8,249,831 B2 | 8/2012 | Vock et al. | |
| 8,307,016 B2 | 11/2012 | Szyperski et al. | |
| 8,375,784 B2 | 2/2013 | Bamberg et al. | |
| 8,676,541 B2 * | 3/2014 | Schrock ............. | A63B 69/0028 |
| | | | 702/188 |
| 8,879,685 B2 | 11/2014 | Oshio | |
| 8,904,673 B2 | 12/2014 | Johnson et al. | |
| 8,931,348 B2 | 1/2015 | Kunert | |
| 9,089,182 B2 | 7/2015 | Schrock et al. | |
| 9,110,498 B2 | 8/2015 | Martinez et al. | |
| 9,668,541 B2 * | 6/2017 | Lee ........................ | A43B 7/081 |
| 10,034,512 B2 | 7/2018 | Rushbrook et al. | |
| 10,151,648 B2 * | 12/2018 | Walker ................. | A43B 13/203 |
| 10,188,169 B2 * | 1/2019 | Beers ................... | A43C 11/165 |
| 10,617,174 B1 | 4/2020 | Hopkins et al. | |
| 11,076,655 B2 | 8/2021 | Beers et al. | |
| 11,758,969 B2 | 9/2023 | Beers et al. | |
| 2003/0009308 A1 | 1/2003 | Kirtley | |
| 2009/0113762 A1 | 5/2009 | Leimer et al. | |
| 2010/0274364 A1 | 10/2010 | Pacanowsky et al. | |
| 2011/0054359 A1 | 3/2011 | Sazonov et al. | |
| 2012/0291564 A1 | 11/2012 | Amos et al. | |
| 2013/0137943 A1 | 5/2013 | Pinto et al. | |
| 2013/0152430 A1 | 6/2013 | Bier et al. | |
| 2013/0213145 A1 | 8/2013 | Owings et al. | |
| 2014/0013862 A1 | 1/2014 | Lind | |
| 2014/0033572 A1 | 2/2014 | Steier et al. | |
| 2014/0070042 A1 | 3/2014 | Beers et al. | |
| 2015/0128448 A1 | 5/2015 | Lockyer | |
| 2015/0177081 A1 | 6/2015 | Steier | |
| 2015/0327622 A1 | 11/2015 | Chaigne | |
| 2015/0359457 A1 | 12/2015 | Blumenthal et al. | |
| 2015/0362395 A1 | 12/2015 | Goossens et al. | |
| 2016/0081418 A1 | 3/2016 | Amos et al. | |
| 2016/0256665 A1 | 9/2016 | Doshi et al. | |
| 2017/0265560 A1 | 9/2017 | Beers et al. | |
| 2017/0265576 A1 | 9/2017 | Beers et al. | |

| | | |
|---|---|---|
| 2017/0267485 A1 | 9/2017 | Schneider et al. |
| 2018/0289096 A1 | 10/2018 | Mo et al. |
| 2019/0029914 A1 | 1/2019 | Polygerinos et al. |
| 2019/0098963 A1 | 4/2019 | Beers et al. |
| 2019/0104802 A1 | 4/2019 | Beers et al. |
| 2020/0054096 A1 | 2/2020 | Beers et al. |
| 2020/0085133 A1 | 3/2020 | Beers et al. |
| 2021/0352995 A1 | 11/2021 | Beers et al. |

FOREIGN PATENT DOCUMENTS

| | | |
|---|---|---|
| WO | 2009152456 | 12/2009 |
| WO | 2013126751 | 8/2013 |
| WO | 2013182633 | 12/2013 |
| WO | 2017161040 | 9/2017 |

OTHER PUBLICATIONS

"International Application Serial No. PCT US2017 022579, Written Opinion mailed Jun. 28, 2017", 5 pgs.

"U.S. Appl. No. 15/070,084, Restriction Requirement mailed Apr. 11, 2018", 9 pgs.

"U.S. Appl. No. 15/070,084, Response filed Jun. 11, 2018 to Restriction Requirement Action mailed Apr. 11, 2018", 7 pgs.

"U.S. Appl. No. 15/070,084, Notice of Allowance mailed Sep. 5, 2018", 8 pgs.

"International Application Serial No. PCT US2017 022579, International Preliminary Report on Patentability mailed Sep. 27, 2018", 7 pgs.

"U.S. Appl. No. 15/070,084, Notice of Allowability mailed Dec. 4, 2018", 2 pgs.

"U.S. Appl. No. 15/070,084, Corrected Notice of Allowability mailed Dec. 12, 2018", 2 pgs.

"European Application Serial No. 17767471.0, Response filed Apr. 29, 2019 to Communication Pursuant to Rules 161 and 162 mailed Oct. 25, 2018", 13 pgs.

"U.S. Appl. No. 16/212,175, Notice of Allowance mailed Jul. 30, 2019", 8 pgs.

"U.S. Appl. No. 16/212,175, Notice of Allowability mailed Sep. 30, 2019", 2 pgs.

"European Application Serial No. 17767471.0, Extended European Search Report mailed Oct. 11, 2019", 5 pgs.

"U.S. Appl. No. 16/212,175, Notice of Allowance mailed Dec. 3, 2019", 6 pgs.

"European Application Serial No. 17767471.0, Response filed Jan. 8, 2020 to Extended European Search Report mailed Oct. 11, 2019", 1 pg.

"U.S. Appl. No. 16/212,175, Supplemental Notice of Allowability mailed Feb. 21, 2020", 2 pgs.

"U.S. Appl. No. 16/687,066, Non Final Office Action mailed Oct. 15, 2020", 6 pgs.

"U.S. Appl. No. 16/687,066, Examiner Interview Summary mailed Oct. 27, 2020", 3 pgs.

"U.S. Appl. No. 16/687,066, Response filed Feb. 15, 2021 to Non Final Office Action mailed Oct. 15, 2020", 6 pgs.

"U.S. Appl. No. 16/687,066, Notice of Allowance mailed Mar. 26, 2021", 7 pgs.

"U.S. Appl. No. 16/687,066, Supplemental Notice of Allowability mailed Jun. 25, 2021", 2 pgs.

"U.S. Appl. No. 17/388,274, Non Final Office Action mailed Jan. 10, 2023", 7 pgs.

"U.S. Appl. No. 17/388,274, Response filed Apr. 10, 2023 to Non Final Office Action mailed Jan. 10, 2023", 8 pgs.

"U.S. Appl. No. 17/388,274, Notice of Allowance mailed May 8, 2023", 7 pgs.

"U.S. Appl. No. 17/388,274, PTO Response to Rule 312 Communication mailed Jun. 29, 2023", 2 pgs.

\* cited by examiner

MOVING AIR IN A FORCE SENSITIVE RESISTOR — 1910

MOVING AIR FROM THE ACTIVE PORTION
INTO A HORIZONTAL PASSAGEWAY — 1920

MOVING AIR FROM THE ACTIVE PORTION
TO A VERTICAL CHANNEL — 1930

EXPANDING AN ELASTIC MEMBRANE — 1940

SENSOR FOR AN ARTICLE OF FOOTWEAR

RELATED APPLICATIONS

This application is a continuation of U.S. patent application Ser. No. 14/388,274, filed Jul. 29, 2021, issued on Sep. 19, 2023 as U.S. Pat. No. 11,758,969, which application is a continuation of U.S. patent application Ser. No. 16/687, 066, filed Nov. 18, 2019, issued on Aug. 3, 2021 as U.S. Pat. No. 11,076,655, which application is a continuation of U.S. patent application Ser. No. 16/212,175, filed Dec. 6, 2018, issued on Apr. 14, 202 as U.S. Pat. No. 10,617,159, which application is a division of U.S. patent application Ser. No. 15/070,084, filed Mar. 15, 2016, issued on Jan. 29, 2019 as U.S. Pat. No. 10,188,169, the contents of which are incorporated herein by reference in their entireties.

BACKGROUND

The present embodiments relate generally to articles of footwear and methods of manufacturing an article of footwear.

Articles of footwear generally include two primary elements: an upper and a sole structure. The upper is often formed from a plurality of material elements (e.g., textiles, polymer sheet layers, foam layers, leather, synthetic leather) that are stitched or adhesively bonded together to form a void on the interior of the footwear for comfortably and securely receiving a foot. More particularly, the upper forms a structure that extends over instep and toe areas of the foot, along medial and lateral sides of the foot, and around a heel area of the foot. The upper may also incorporate a lacing system to adjust the fit of the footwear, as well as permitting entry and removal of the foot from the void within the upper. Likewise, some articles of apparel may include various kinds of closure systems for adjusting the fit of the apparel.

SUMMARY

In one aspect, the present disclosure is directed to an article of footwear comprising an upper and a sole structure, where the sole structure includes a cavity, and a force sensitive resistor that includes an active portion joined to a tail portion. The force sensitive resistor includes a plurality of layers, each of the plurality of layers being elongated in a substantially horizontal direction. In addition, the plurality of layers comprises a top substrate layer, a first adhesive layer, and a bottom substrate layer, where the first adhesive layer is disposed between the top substrate layer and the bottom substrate layer. A shaft extends in a substantially vertical direction through at least the bottom substrate layer, the shaft leading to an opening formed in an outermost surface of the bottom substrate layer. Furthermore, a horizontal passageway extends in a substantially horizontal direction from the active portion to the tail portion, the horizontal passageway being in fluid communication with the shaft. The horizontal passageway provides a first flowpath through the force sensitive resistor, and the shaft provides a second flowpath through the force sensitive resistor. In addition, an elastic membrane is secured over the opening, the elastic membrane deforming in response to increased air pressure in the shaft.

In another aspect, the present disclosure is directed to an article of footwear comprising a sole structure with a cavity formed in the sole structure, and a force sensitive resistor including an active portion joined to a tail portion. The force sensitive resistor includes a plurality of layers, where each of the plurality of layers comprises a substantially two-dimensional material. In addition, the plurality of layers comprises a top substrate layer, a first adhesive layer, and a bottom substrate layer, where the first adhesive layer is disposed between the top substrate layer and the bottom substrate layer. There is a shaft extending in a substantially vertical direction through at least two of the plurality of layers in the tail portion, the shaft leading to a first opening formed in an outermost surface of the force sensitive resistor, and the first opening being covered by an elastic membrane. In addition, a horizontal passageway extends in a substantially horizontal direction from the active portion to the tail portion, the horizontal passageway being in fluid communication with the shaft. Furthermore, the elastic membrane is configured to deform and expand in a direction away from the first adhesive layer, thereby transitioning from a neutral state to an actuated state. The elastic membrane further includes a first surface area in the neutral state and a second surface area in the actuated state, the second surface area being greater than the first surface area.

In another aspect, the present disclosure is directed to a method of moving air in a force sensitive resistor, the force sensitive resistor including a top substrate layer, a first adhesive layer, and a bottom substrate layer, the force sensitive resistor comprising an active portion and a tail portion. The method comprises moving air from the active portion into a horizontal passageway formed in the force sensitive resistor when the active portion is compressed, and moving air from the active portion to a vertical channel disposed in the bottom substrate layer in the tail portion. The method also includes expanding an elastic membrane that is exposed to increased air pressure.

Other systems, methods, features, and advantages of the embodiments will be, or will become, apparent to one of ordinary skill in the art upon examination of the following figures and detailed description. It is intended that all such additional systems, methods, features, and advantages be included within this description and this summary, be within the scope of the embodiments, and be protected by the following claims.

BRIEF DESCRIPTION OF THE DRAWINGS

The embodiments can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

Figure 1:
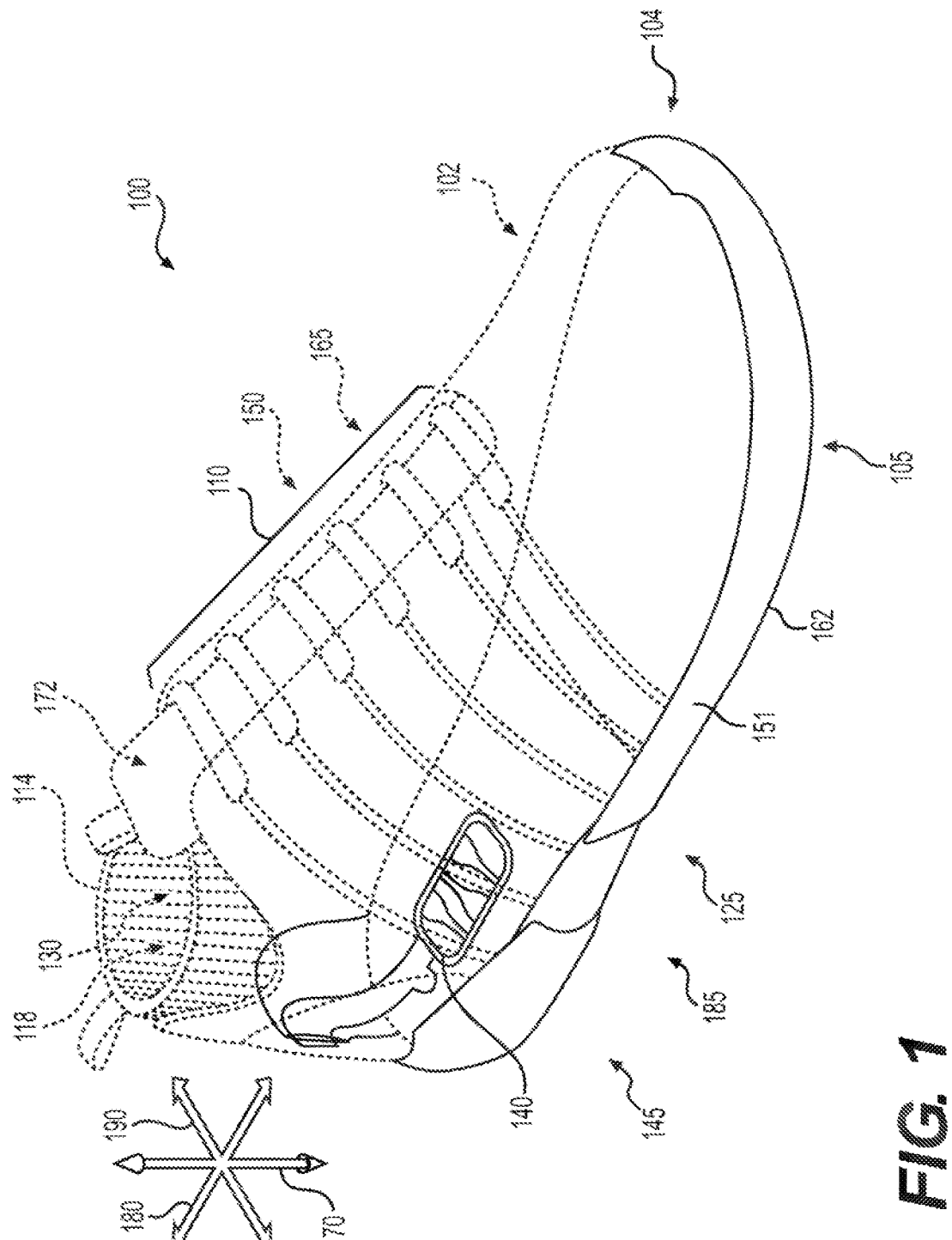
FIG. 1 is an isometric side view of an embodiment of an article of footwear and a sensor device.

The following discussion and accompanying figures disclose articles of footwear and a method of assembly of an article of footwear. Concepts associated with the footwear disclosed herein may be applied to a variety of athletic footwear types, including running shoes, basketball shoes, soccer shoes, baseball shoes, football shoes, and golf shoes, for example. Accordingly, the concepts disclosed herein apply to a wide variety of footwear types.

To assist and clarify the subsequent description of various embodiments, various terms are defined herein. Unless otherwise indicated, the following definitions apply throughout this specification (including the claims). For consistency and convenience, directional adjectives are employed throughout this detailed description corresponding to the illustrated embodiments.

The term "longitudinal," as used throughout this detailed description and in the claims, refers to a direction extending a length of a component. For example, a longitudinal direction of an article of footwear extends between a forefoot region and a heel region of the article of footwear. The term "forward" is used to refer to the general direction in which the toes of a foot point, and the term "rearward" is used to refer to the opposite direction, i.e., the direction in which the heel of the foot is facing.

The term "lateral direction," as used throughout this detailed description and in the claims, refers to a side-to-side direction extending a width of a component. In other words, the lateral direction may extend between a medial side and a lateral side of an article of footwear, with the lateral side of the article of footwear being the surface that faces away from the other foot, and the medial side being the surface that faces toward the other foot.

The term "side," as used in this specification and in the claims, refers to any portion of a component facing generally in a lateral, medial, forward, or rearward direction, as opposed to an upward or downward direction.

The term "vertical," as used throughout this detailed description and in the claims, refers to a direction generally perpendicular to both the lateral and longitudinal directions. For example, in cases where a sole is planted flat on a ground surface, the vertical direction may extend from the ground surface upward. It will be understood that each of these directional adjectives may be applied to individual components of a sole. The term "upward" refers to the vertical direction heading away from a ground surface, while the term "downward" refers to the vertical direction heading toward the ground surface. Similarly, the terms "top," "upper," and other similar terms refer to the portion of an object substantially furthest from the ground in a vertical direction, and the terms "bottom," "lower," and other similar terms refer to the portion of an object substantially closest to the ground in a vertical direction.

The "interior" of a shoe refers to space that is occupied by a wearer's foot when the shoe is worn. The "inner side" of a panel or other shoe element refers to the face of that panel or element that is (or will be) oriented toward the shoe's interior in a completed shoe. The "outer side" or "exterior" of an element refers to the face of that element that is (or will be) oriented away from the shoe's interior in the completed shoe. In some cases, the inner side of an element may have other elements between that inner side and the interior in the completed shoe. Similarly, an outer side of an element may have other elements between that outer side and the space external to the completed shoe. Further, the terms "inward" and "inwardly" shall refer to the direction toward the interior of the shoe, and the terms "outward" and "outwardly" shall refer to the direction toward the exterior of the shoe.

For purposes of this disclosure, the foregoing directional terms, when used in reference to an article of footwear, shall refer to the article of footwear when sitting in an upright position, with the sole facing groundward, that is, as it would be positioned when worn by a wearer standing on a substantially level surface.

In addition, for purposes of this disclosure, the term "fixedly attached" shall refer to two components joined in a manner such that the components may not be readily separated (for example, without destroying one or both of the components). Exemplary modalities of fixed attachment may include joining with permanent adhesive, rivets, stitches, nails, staples, welding or other thermal bonding, or other joining techniques. In addition, two components may be "fixedly attached" by virtue of being integrally formed, for example, in a molding process.

For purposes of this disclosure, the term "removably attached" or "removably inserted" shall refer to the joining of two components or a component and an element in a manner such that the two components are secured together, but may be readily detached from one another. Examples of removable attachment mechanisms may include hook and loop fasteners, friction fit connections, interference fit connections, threaded connectors, cam-locking connectors, compression of one material with another, and other such readily detachable connectors.

Referring to FIG. 1, an isometric side view of an article of footwear ("article") 100 that is configured with a tensioning system 150 is depicted. In the current embodiment, article 100 is shown in the form of an athletic shoe, such as a running shoe. However, in other embodiments, tensioning system 150 may be used with any other kind of footwear including, but not limited to, hiking boots, soccer shoes, football shoes, sneakers, running shoes, cross-training shoes, rugby shoes, basketball shoes, baseball shoes as well as other kinds of shoes. Moreover, in some embodiments, article 100 may be configured for use with various kinds of non-sports-related footwear, including, but not limited to, slippers, sandals, high-heeled footwear, loafers as well as any other kinds of footwear. As discussed in further detail below, a tensioning system may not be limited to footwear and in other embodiments a tensioning system and/or components associated with a tensioning system could be used with various kinds of apparel, including clothing, sportswear, sporting equipment and other kinds of apparel. In still other embodiments, a tensioning system may be used with braces, such as medical braces.

As noted above, for consistency and convenience, directional adjectives are employed throughout this detailed description. Article 100 may be divided into three general regions along a longitudinal axis 180: a forefoot region 105, a midfoot region 125, and a heel region 145. Forefoot region 105 generally includes portions of article 100 corresponding with the toes and the joints connecting the metatarsals with the phalanges. Midfoot region 125 generally includes portions of article 100 corresponding with an arch area of the foot. Heel region 145 generally corresponds with rear portions of the foot, including the calcaneus bone. Forefoot region 105, midfoot region 125, and heel region 145 are not intended to demarcate precise areas of article 100. Rather, forefoot region 105, midfoot region 125, and heel region 145 are intended to represent general relative areas of article 100 to aid in the following discussion. Since various features of article 100 extend beyond one region of article 100, the terms forefoot region 105, midfoot region 125, and heel region 145 apply not only to article 100, but also to the various features of article 100.

Referring to FIG. 1, for reference purposes, a lateral axis 190 of article 100, and any components related to article 100, may extend between a medial side 165 and a lateral side 185 of the foot. Additionally, in some embodiments, longitudinal axis 180 may extend from forefoot region 105 to a heel region 145. It will be understood that each of these directional adjectives may also be applied to individual components of an article of footwear, such as an upper and/or a sole member. In addition, a vertical axis 170 refers to the axis perpendicular to a horizontal surface defined by longitudinal axis 180 and lateral axis 190.

Article 100 may include upper 102 and sole structure 104. Generally, upper 102 may be any type of upper. In particular, upper 102 may have any design, shape, size and/or color. For example, in embodiments where article 100 is a basketball shoe, upper 102 could be a high top upper that is shaped to provide high support on an ankle. In embodiments where article 100 is a running shoe, upper 102 could be a low top upper.

As shown in FIG. 1, upper 102 may include one or more material elements (for example, meshes, textiles, foam, leather, and synthetic leather), which may be joined to define an interior void 118 configured to receive a foot of a wearer. The material elements may be selected and arranged to impart properties such as light weight, durability, air permeability, wear resistance, flexibility, and comfort. Upper 102 may define an opening 130 through which a foot of a wearer may be received into interior void 118.

At least a portion of sole structure 104 may be fixedly attached to upper 102 (for example, with adhesive, stitching, welding, or other suitable techniques) and may have a configuration that extends between upper 102 and the ground. Sole structure 104 may include provisions for attenuating ground reaction forces (that is, cushioning and stabilizing the foot during vertical and horizontal loading). In addition, sole structure 104 may be configured to provide traction, impart stability, and control or limit various foot motions, such as pronation, supination, or other motions.

In some embodiments, sole structure 104 may be configured to provide traction for article 100. In addition to providing traction, sole structure 104 may attenuate ground reaction forces when compressed between the foot and the ground during walking, running or other ambulatory activities. The configuration of sole structure 104 may vary significantly in different embodiments to include a variety of conventional or non-conventional structures. In some cases, the configuration of sole structure 104 can be configured according to one or more types of ground surfaces on which sole structure 104 may be used.

For example, the disclosed concepts may be applicable to footwear configured for use on any of a variety of surfaces, including indoor surfaces or outdoor surfaces. The configuration of sole structure 104 may vary based on the properties and conditions of the surfaces on which article 100 is anticipated to be used. For example, sole structure 104 may vary depending on whether the surface is hard or soft. In addition, sole structure 104 may be tailored for use in wet or dry conditions.

In some embodiments, sole structure 104 may be configured for a particularly specialized surface or condition. The proposed footwear upper construction may be applicable to any kind of footwear, such as basketball, soccer, football, and other athletic activities. Accordingly, in some embodiments, sole structure 104 may be configured to provide traction and stability on hard indoor surfaces (such as hardwood), soft, natural turf surfaces, or on hard, artificial turf surfaces. In some embodiments, sole structure 104 may be configured for use on multiple different surfaces.

As will be discussed further below, in different embodiments, sole structure 104 may include different components. For example, sole structure 104 may include an outsole, a midsole, a cushioning layer, and/or an insole. In addition, in some cases, sole structure 104 can include one or more cleat members or traction elements that are configured to increase traction with a ground surface.

In some embodiments, sole structure 104 may include multiple components, which may individually or collectively provide article 100 with a number of attributes, such as support, rigidity, flexibility, stability, cushioning, comfort, reduced weight, or other attributes. In some embodiments, sole structure 104 may include an insole/sockliner, a midsole 151, and a ground-contacting outer sole member ("outsole") 162, which may have an exposed, ground-contacting lower surface. In some cases, however, one or more of these components may be omitted. Furthermore, in some embodiments, an insole may be disposed in the void defined by upper 102. The insole may extend through each of forefoot region 105, midfoot region 125, and heel region 145, and between lateral side 185 and medial side 165 of article 100. The insole may be formed of a deformable (for example, compressible) material, such as polyurethane foams, or other polymer foam materials. Accordingly, the insole may, by virtue of its compressibility, provide cushioning, and may also conform to the foot in order to provide comfort, support, and stability.

Midsole 151 may be fixedly attached to a lower area of upper 102, for example, through stitching, adhesive bonding, thermal bonding (such as welding), or other techniques, or may be integral with upper 102. Midsole 151 may be formed from any suitable material having the properties described above, according to the activity for which article 100 is intended. In some embodiments, midsole 151 may include a foamed polymer material, such as polyurethane (PU), ethyl vinyl acetate (EVA), or any other suitable material that operates to attenuate ground reaction forces as sole structure 104 contacts the ground during walking, running, or other ambulatory activities.

Midsole 151 may extend through each of forefoot region 105, midfoot region 125, and heel region 145, and between lateral side 185 and medial side 165 of article 100. In some embodiments, portions of midsole 151 may be exposed around the periphery of article 100, as shown in FIG. 1. In other embodiments, midsole 151 may be completely covered by other elements, such as material layers from upper 102. For example, in some embodiments, midsole 151 and/or other portions of upper 102 may be disposed adjacent to a bootie 114 disposed inside of interior void 118 of article 100. However, other embodiments may not include a bootie.

Furthermore, as shown in FIG. 1, article 100 may include a tongue 172 in some embodiments, which may be provided near or along a throat opening. In some embodiments, tongue 172 may be provided in or near an instep region 110 of article 100. However, in other embodiments, tongue 172 may be disposed along other portions of an article of footwear, or an article may not include a tongue.

In addition, as noted above, in different embodiments, article 100 may include a tensioning system 150. Tensioning system 150 may comprise various components and systems for adjusting the size of an opening 130 leading to interior void 118 and tightening (or loosening) upper 102 around a wearer's foot. Some examples of different tensioning systems that can be used are disclosed in Beers et al., U.S. Patent Publication Number 2014/0070042 published Mar. 13, 2014, (previously U.S. patent application Ser. No. 14/014,555, filed Aug. 30, 2013) and entitled "Motorized Tensioning System with Sensors" and Beers et al., U.S. Pat. No. 8,056,269, issued Nov. 15, 2011 (previously U.S. Patent Publication Number 2009/0272013, published Nov. 5, 2009) and entitled "Article of Footwear with Lighting System" the disclosures of which are incorporated herein by reference in their entirety.

Furthermore, the embodiments described herein may also include or refer to techniques, concepts, features, elements, methods, and/or components from U.S. Patent Publication Number 2016/0345679, published Dec. 1, 2016, (previously U.S. patent application Ser. No. 14/723,972, filed May 28, 2015), titled "An Article of Footwear and A Method of Assembly of The Article of Footwear," U.S. Patent Publication Number 2016/0345653, published Dec. 1, 2016, (previously U.S. patent application Ser. No. 14/723,832, filed May 28, 2015), titled "A Lockout Feature for a Control Device," U.S. Patent Publication Number 2016/0345654, published Dec. 1, 2016, (previously U.S. patent application Ser. No. 14/723,880, filed May 28, 2015), titled "A Charging System for an Article of Footwear," U.S. Patent Publication Number 2016/0345671, published Dec. 1, 2016, (previously U.S. patent application Ser. No. 14/723,994, filed May 28, 2015), titled "A Sole Plate for an Article of Footwear," U.S. Patent Publication Number 2016/0345655, published Dec. 1, 2016, (previously U.S. patent application Ser. No. 14/724, 007, filed May 28, 2015), titled "A Control Device for an Article of Footwear," and U.S. Patent Publication Number 2016/0144613, published May 26, 2016, (previously U.S. patent application Ser. No. 14/944,705, filed Dec. 1, 2015), titled "An Automated Tensioning System For An Article Of Footwear," the entirety of each application being herein incorporated by reference.

In some embodiments, tensioning system 150 may comprise one or more laces, as well as a motorized tensioning device. A lace as used with article 100 may comprise any type of lacing material known in the art. Examples of laces that may be used include cables or fibers having a low modulus of elasticity as well as a high tensile strength. A lace may comprise a single strand of material, or can comprise multiple strands of material. An exemplary material for the lace is SPECTRA™, manufactured by Honeywell of Morris Township NJ, although other kinds of extended chain, high modulus polyethylene fiber materials can also be used as a lace. The arrangement of the lacing depicted in the Figures is only intended to be exemplary and it will be understood that other embodiments are not limited to a particular configuration for lacing elements.

Some embodiments may include one or more compartments, recesses, channels, or other receiving portions that are disposed throughout various portions of article 100. For purposes of this disclosure, a compartment refers to a separate or distinct section or portion of article 100. In some embodiments, a compartment can include a sleeve-like region, a tunnel or tubing disposed within article 100, and/or a recess, cavity, pocket, chamber, slot, pouch, or other space configured to receive an object, element, or component. In some embodiments, during manufacture of article 100, one or more compartments can be included in article 100. For example, as will be discussed further below with respect to FIG. 9, article 100 can include a sleeve or elastic band disposed along an underside of upper 102. In some embodiments, the elastic band can receive or securely hold a component.

As noted above, in different embodiments, article 100 may include other elements. Referring to FIG. 1, article 100 includes bootie 114 that is disposed within upper 102. Bootie 114 may be removed, separated, or detached from article 100 in some embodiments. In one embodiment, the position or arrangement of bootie 114 may be adjusted within article 100. In some embodiments, bootie 114 or other elements may be moved (or removed) and then reinserted or replaced into article 100 (i.e., returned to their original arrangement within article 100) in different embodiments. This can occur after manufacture of article 100, as discussed further below. Bootie 114 and/or other such adjustable inner lining materials or elements (such as a tongue) associated with the disclosed embodiments of article 100 may be referred to as "removable elements" for purposes of this description and the claims.

In one embodiment, bootie 114 can substantially surround or bound an interior void 118 in article 100 and can be removed for insertion of components into article 100. For example, bootie 114 can be pulled or removed from interior void 118 of upper 102. It should be understood that in other embodiments, article 100 may not include bootie 114, or the configuration of bootie 114 may differ from that illustrated herein. In some embodiments, the removal of bootie 114 may expose or facilitate access regions within article 100 to one or more compartments. In one embodiment, the displacement of bootie 114 and/or other removable elements (for example, a tongue) can expose different areas within interior void 118.

Furthermore, it should be understood that the embodiments described herein with respect to the compartments in FIG. 1, and in further figures, may be applicable to articles that do not include a tensioning system. In other words, the method of manufacture where an article can include compartments, and/or the article, which includes such compartments, may be utilized in any type or configuration of footwear or article of apparel.

As noted above, some embodiments of article 100 may utilize various kinds of devices for sending or providing information regarding use of article 100 to a motorized tensioning or lacing system or other mechanisms. In different embodiments, an article may include provisions for detecting changes that can occur during use of article 100.

For example, some embodiments can incorporate a one or more sensors for providing information to a motorized tensioning system. One embodiment of a sensor device ("device") 140 is depicted within sole structure 104 of article 100 in FIG. 1. In some embodiments, device 140 may provide a current as an input to a control unit. In some cases, for example, a predetermined current may be known to correspond to a certain pressure or weight. In one embodiment, pressure sensors could be used under the insoles of an article to indicate when the user is standing. In another embodiment, a motorized tensioning system can be programmed to automatically loosen the tension of the lace when the user moves from the standing position to a sitting position. Such configurations may be useful for older adults that may require low tension when sitting to promote blood circulation but high tension for safety when standing. In other embodiments, various features of a motorized tensioning system may turn on or off, or adjust the tension of a lace, in response to information from a sensor. In other embodiments, sensor devices may be used to provide information that can determine the activation of LED or other light sources. However, in other embodiments, it will be understood that the use of any sensor may be optional, or that the sensor as described herein may be used in an article that does not include a motorized tensioning system.

In different embodiments, the types of sensor devices providing information to systems associated with article 100 might include, but are not limited to, pressure sensors in shoe insoles to detect when the wearer is standing and/or rate of motion, bend indicators, strain gauges, gyroscopes, and accelerometers. In some embodiments, instead of or in addition to maintaining an initial tension, the sensor information may be used to establish a new target tension. For example, pressure sensors could be used to measure contact pressures of the upper of an article of footwear against the foot of a wearer and automatically adjust to achieve a desired pressure.

In some embodiments, sensor devices such as gyroscopes and accelerometers could be incorporated into article 100. In some embodiments, an accelerometer and/or gyroscope could be used to detect sudden movement and/or position information that may be used as feedback for adjusting lace tension, for example. These sensors could also be implemented to control periods of sleep/awake to extend battery life. In some cases, for example, information from these sensors could be used to reduce lacing tension in a system when the user is inactive, and increase lacing tension during periods of greater activity.

It is further contemplated that in some embodiments a user could be provided with feedback through motor pulsing, which generates haptic feedback for the user in the form of vibrations/sounds. Such provisions could facilitate operation of a tensioning system directly, or provide haptic feedback for other systems in communication with a motorized tensioning device.

In one embodiment, device 140 can detect changes in pressure or weight (i.e., a force). In some embodiments, device 140 may include various mechanisms or components that can be utilized for measuring current, pressure, or other properties in article 100. In different embodiments, device 140 may detect and measure a relative change in a force or applied load, detect and measure the rate of change in force, identify force thresholds and/or detect contact and/or touch.

In some embodiments, a sensor device can detect changes in pressure. In different embodiments, the sensor may detect and measure a relative change in a force or applied load, detect and measure the rate of change in force, identify force thresholds, and/or detect contact and/or touch. In one embodiment, shown in FIG. 1, device 140 comprises a force sensitive resistor (herein referred to as an "FSR"). In some cases, the FSR may comprise a generally two-dimensional material. In some embodiments, device 140 may include a piezoelectric material. In other embodiments, the sensor may have different dimensions and/or shapes in different embodiments and be disposed in other regions or portions of article 100 than shown here. In some embodiments, the application of pressure (for example, of a foot being inserted into article 100) can activate the sensor, which in turn can trigger other events, such as autolacing.

Figure 2:
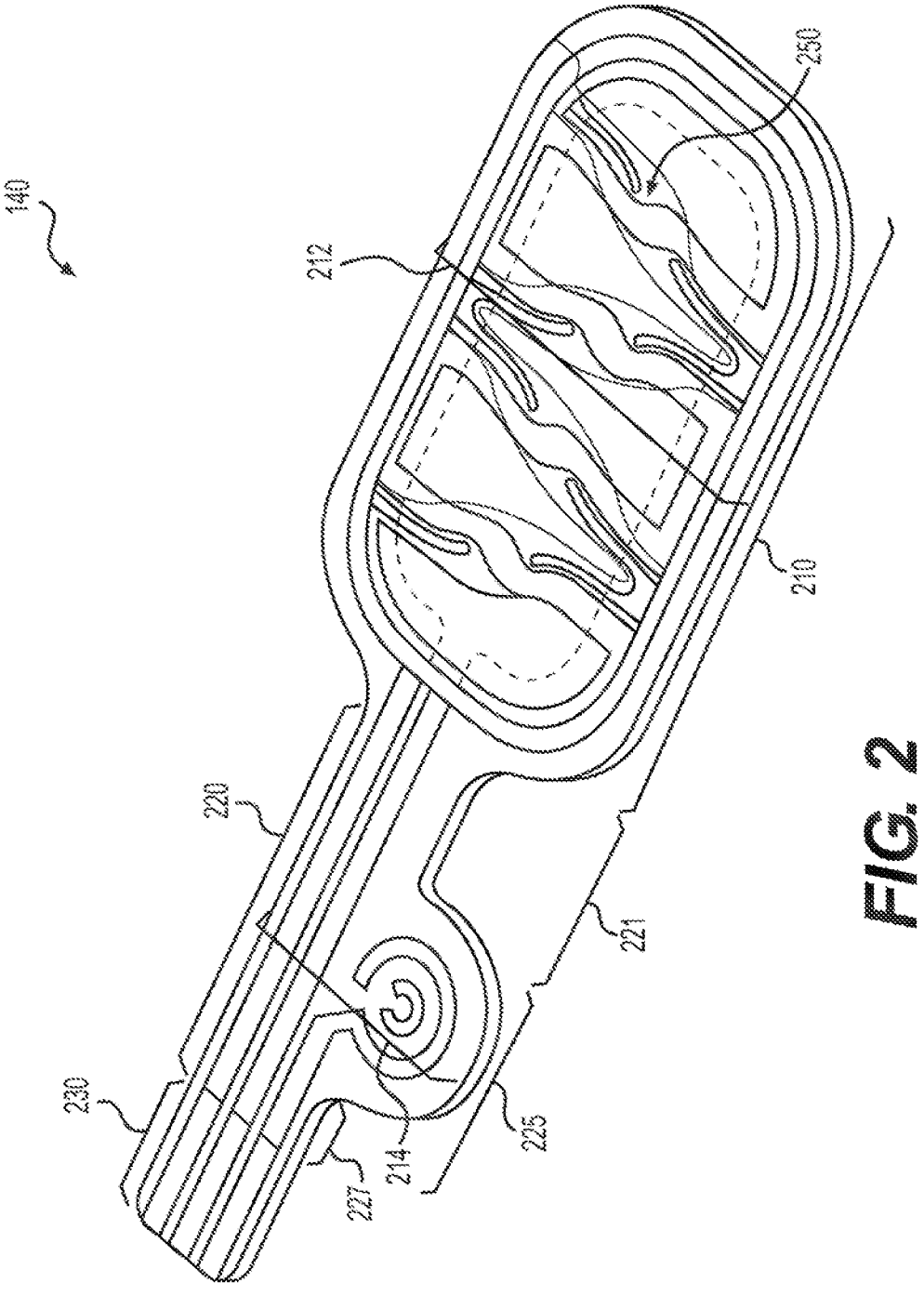
FIG. 2 is an isometric top view of an embodiment of a sensor device.

As depicted in FIG. 1, an FSR (here, device 140) may be located or inserted along heel region 145 of article 100. In the embodiment of FIG. 2, an isometric view of device 140 is depicted. Generally, in some embodiments, device 140 can include at least two film or substrate layers separated by a spacer or adhesive layer. Each of the layers can be elongated in a substantially horizontal direction. In some embodiments, one or more layers of device 140 may comprise a substantially flat sheet or panel or other two-dimensional material or structure. The term "two-dimensional" as used throughout this detailed description and in the claims refers to any generally flat material exhibiting a length and width that are substantially greater than a thickness of the material. Although two-dimensional materials may have smooth or generally untextured surfaces, some two-dimensional materials will exhibit textures or other surface characteristics, such as dimpling, protrusions, ribs, or various patterns, for example. In other embodiments, the geometry of device 140 could vary and could include various contours or features associated with parts of a foot, for example, the heel region of a foot.

In different embodiments, device 140 can include actuation or conductive regions 250 associated with one or more layers. In one embodiment, force-sensing resistor ink (e.g., an "FSR element") is screen printed on or otherwise applied to a first layer. Thus, in some cases, device 140 can include an FSR layer that includes FSR element(s). In some embodiments, a second layer receives or includes a conductive material. For example, in some cases, a series of electrode interdigitated "fingers" can be formed along the second layer. In one embodiment, the second layer comprises a conductive layer. In one embodiment, the two layers can be assembled with the printed surfaces facing each other and can be adhered together with a double-stick adhesive spacer around the perimeter. In some embodiments, device 140 comprises a resistor that changes its resistive value depending on how much it is pressed or compressed. In some embodiments, one layer can deflect and yield to an applied force, forming an area of contact between the FSR element and the circuit. As the force is increased, the area of contact also increases and the output becomes more conductive in different embodiments. However, in other embodiments, device 140 may operate in any manner known in the art in which a device comprises a mechanism wherein upon the application of normal force on the device, the electrical resistance changes.

For purposes of reference, device 140 can include different portions. As shown in FIG. 2, device 140 comprises an active sensor portion ("active portion") 210 joined to a tail portion 220. Tail portion 220 can include traces in some embodiments. In addition, in some embodiments, tail portion 220 may be further joined to a connector portion 230, though in other embodiments, device 140 may not include connector portion 230. In one embodiment, connector portion 230 can comprise an AMP or amplifier connector with a receptacle (female) ending. In some embodiments, a housing protects the contacts of connector portion 230. In one embodiment, connector portion 230 can be joined to an element or component of the automated tensioning system (see FIG. 1). It should be understood that in other embodiments, device 140 can include any additional or alternative semiconductive materials, conductors, adhesives, graphics or overlays, and connectors.

Active portion 210 can differ in size and shape relative to tail portion 220. For example, in some embodiments, active portion 210 has a different width from tail portion 220. In FIG. 2, active portion 210 has a sensor width 212 that is larger than a tail width 214 of tail portion 220. However, in other embodiments, the width of active portion 210 can vary, where sensor width 212 is the maximum width associated with active portion 210 and tail width 214 is the maximum width associated with tail portion 220. Furthermore, tail portion 220 comprises an elongated portion 221 and an end portion 227 joined along an intermediate portion 225. In some embodiments, the width associated with elongated portion 221 is substantially narrow relative to the width of intermediate portion 225, and can be narrower than the width of end portion 227.

Thus, it should be understood that portions comprising device 140 may have different dimensions and/or shapes in different embodiments. For example, in FIG. 2, active portion 210 has a substantially elongated, oval shape. However, in other embodiments, the dimensions and/or shape of active portion 210 or tail portion 220 may differ, including, but not limited to, rectangular, oblong, square, circular, elliptical, or other regular or irregular shapes. In some embodiments, the electrically active area associated with active portion 210 can be larger or smaller than described herein.

Figure 3:
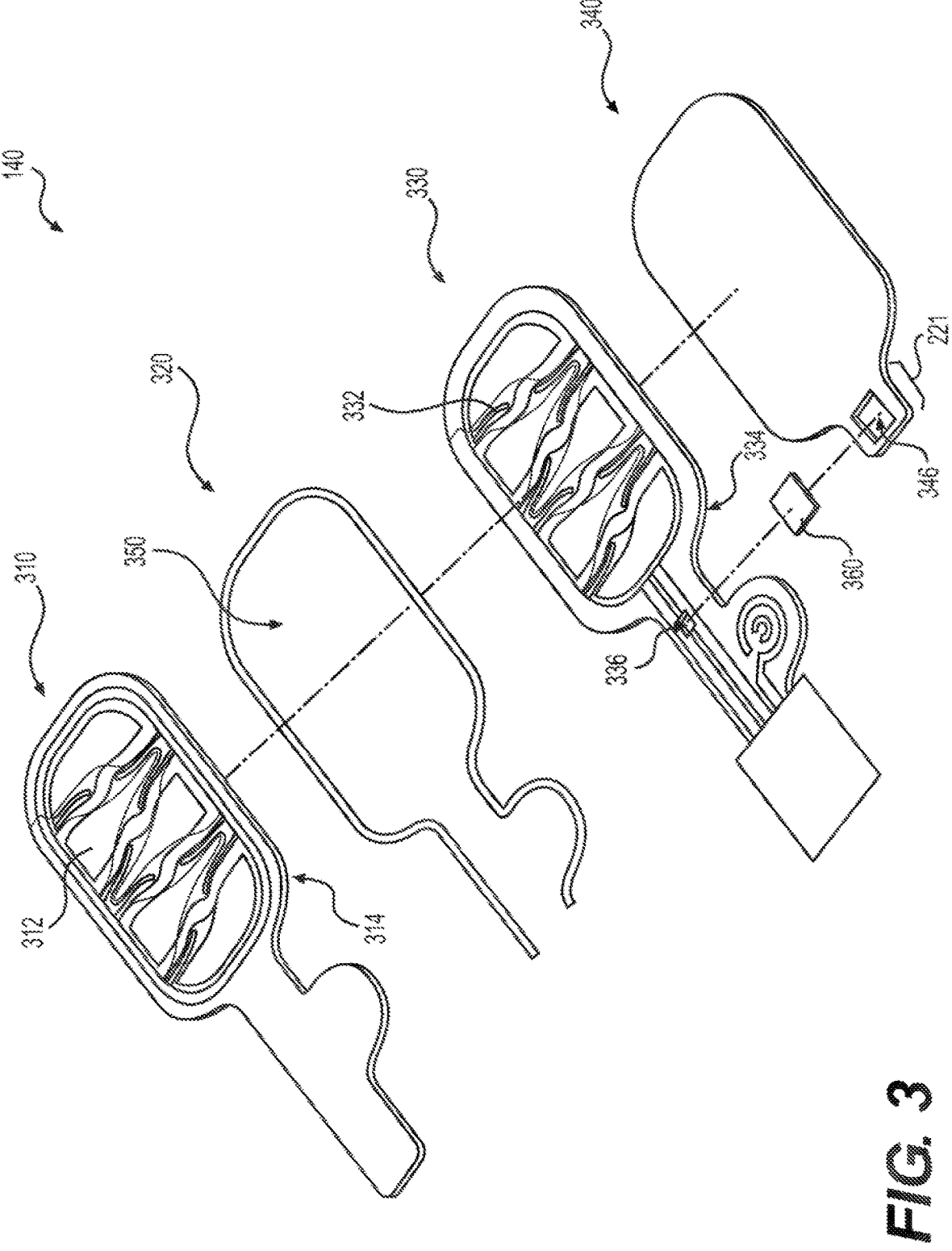
FIG. 3 is an exploded view of an embodiment of a sensor device.

In order to provide the reader with a greater understanding of the embodiments, FIG. 3 depicts an exploded view of an embodiment of device 140. As noted above, device 140 includes a plurality of layers. In the embodiment of FIG. 3, device 140 comprises a top substrate layer 310, a first adhesive layer 320, and a bottom substrate layer 330. It should be understood that in different embodiments, top substrate layer 310 may comprise either an FSR layer or a conductor layer, or another type of FSR substrate layer. Similarly, in some embodiments, bottom substrate layer 330 may comprise either an FSR layer or a conductor layer, or another type of FSR substrate layer.

In some embodiments, first adhesive layer 320 is disposed between top substrate layer 310 and bottom substrate layer 330. In addition, in some embodiments, device 140 can include a kind of surface or backing to push against such that when a force is applied to the device, there is support provided. For example, in some embodiments, a second adhesive layer 340 is also included in device 140. However, it should be understood that other embodiments of device 140 may comprise fewer or a greater number of layers. In different embodiments, the substrate layers of device 140 are mounted to a rigid or semi-rigid backed surface comprising second adhesive layer 340. Furthermore, in some embodiments, second adhesive layer 340 provides an outermost surface layer of device 140. In FIG. 3, second adhesive layer 340 is disposed beneath or adjacent to bottom substrate layer 330.

In some embodiments, first adhesive layer 320 can act as a spacer between top substrate layer 310 and bottom substrate layer 330. In other words, in some embodiments, the two substrate layers (i.e., top substrate layer 310 and bottom substrate layer 330) can be spaced apart using various thicknesses of spacer material (here, first adhesive layer 320), forming an air gap between the two substrate layers in some cases. In different embodiments, first adhesive layer 320 includes or bounds an exposed region 350, in which no spacer material is present in first adhesive layer 320. In some embodiments, first adhesive layer 320 comprises a substantially narrow or elongated material extending along the perimeter of device 140, similar to a border corresponding at least partially to the shape of top substrate layer 310 and/or bottom substrate layer 330.

As a result of the inclusion of exposed region 350, in some embodiments, there may be portions of top substrate layer 310 and bottom substrate layer 330 that directly face one another. In FIG. 3, it can be seen that a top outer surface 312 of top substrate layer 310 faces upward and provides an outermost surface of device 140. Furthermore, a top inner surface 314 of top substrate layer 310 (the surface that is opposite to top outer surface 312) faces toward the remainder of device 140. In addition, top inner surface 314 of top substrate layer 310 can face directly—and in some embodiments contact—a bottom inner surface 332 of bottom substrate layer 330. In addition, bottom outer surface 334 of bottom substrate layer 330 can contact or face toward second adhesive layer 340 in some embodiments.

In different embodiments, first adhesive layer 320 can comprise different materials. In one embodiment, first adhesive layer 320 can include a double-stick adhesive. In different embodiments, it can be understood that one or more of the height or thickness of first adhesive layer 320, an inside diameter or width of first adhesive layer 320, the open area (here, exposed region 350) of first adhesive layer 320, as well as the thickness of top substrate layer 310, can mechanically determine the amount of force required for the two surfaces comprising top inner surface 314 of top substrate layer 310 and bottom inner surface 332 of bottom substrate layer 330 to come into contact.

While first adhesive layer 320 is illustrated as being positioned between top substrate layer 310 and bottom substrate layer 330 in FIG. 3, it should be understood that in other embodiments, other materials or mechanisms may be used to provide spacing between the two substrate layers. For example, in some embodiments, dielectric dot patterns can also be used for spacing the two layers apart, where the frequency or spacing and height of the dots can help determine the amount of force needed for activation. In one embodiment, the closer the dots are to each other, the more force is required to activate the sensor. In other embodiments, any other means of providing spacing between the two substrate layers known in the art may be utilized.

Furthermore, in different embodiments, one or more layers of device 140 can include apertures or openings formed within the material comprising the layer. For example, in FIG. 3, it can be seen that bottom substrate layer 330 includes a first aperture 336 formed along a portion of the exploded elongated portion 221 of tail portion 220, and second adhesive layer 340 includes a second aperture 346 formed along a portion of the exploded elongated portion 221 of tail portion 220. In some embodiments, the shape of each aperture can vary. In some embodiments, an aperture can have any shape, including, but not limited to, rectangular, oblong, square, circular, elliptical, or other regular or irregular shapes. In FIG. 3, first aperture 336 has a substantially square or rectangular shape, and second aperture 346 has a substantially rectangular shape. In different embodiments, bottom substrate layer 330 and second adhesive layer 340 may be positioned such that the apertures are aligned when device 140 is assembled. In other words, in some embodiments, first aperture 336 can be disposed such that it overlaps or extends across the opening provided by second aperture 346. In other embodiments, there may be additional apertures formed in any of top substrate layer 310, bottom substrate layer 330, first adhesive layer 320, and/or second adhesive layer 340. However, in some embodiments, there may be no apertures in device 140, or any of top substrate layer 310, bottom substrate layer 330, first adhesive layer 320, and/or second adhesive layer 340 may be substantially continuous.

In addition, in different embodiments, device 140 may include provisions for covering or protecting portions of device 140. As will be discussed further below with respect to FIGS. 9-12, an elastic membrane (for example, a latex or rubber material) comprising a cover portion 360 can be incorporated into or attached to device 140 in some embodiments. In other embodiments, cover portion 360 can comprise any other substantially resilient and elastic material. As shown in FIG. 3, cover portion 360 can be disposed between bottom substrate layer 330 and second adhesive layer 340 in some embodiments. In one embodiment, cover portion 360 is located such that, when device 140 is assembled, cover portion 360 extends between and covers the opening associated with first aperture 336. However, it should be understood that in other embodiments, cover portion 360 can be disposed along any other location. Furthermore, the size of cover portion 360 can be increased or decreased to correspond to the size of any aperture formed in device 140 in different embodiments. As will be discussed with respect to FIGS. 15 and 16, in some embodiments, cover portion 360 can alternatively be located along an outermost surface of device 140, adjacent to second aperture 346, and be sized and dimensioned to cover the opening associated with second aperture 346.

In some embodiments, FSR-type devices can include provisions for routing or permitting air to flow from one region of the device to another region of the device. In different embodiments, an air vent or other type of conduit can be formed through the device. In one embodiment, an air vent can run from the open active area associated with active portion 210 and down the entire length or only a portion of tail portion 220. In some cases, air can be routed such that it exits out to the external atmosphere. In different embodiments, a vent or conduit can help improve pressure equilibrium with the environment, as well as facilitate an even loading and unloading of the device. However, as will be described herein, in some embodiments, air can be routed and/or displaced through device 140 without physically exiting from the interior of device 140.

In different embodiments, device 140 can include provisions for helping circulate or move air or other gaseous fluids through device 140. In some embodiments, a continuous flow pathway or conduit can be formed in device 140, helping air located within device 140 to move through different portions of device 140 as it actuates and is released and returns to a neutral state. In one embodiment, the inclusion of a flow pathway can improve the repeatability of the sensor device to variance in ambient air pressure and increases the response time of the sensor.

Figure 4:
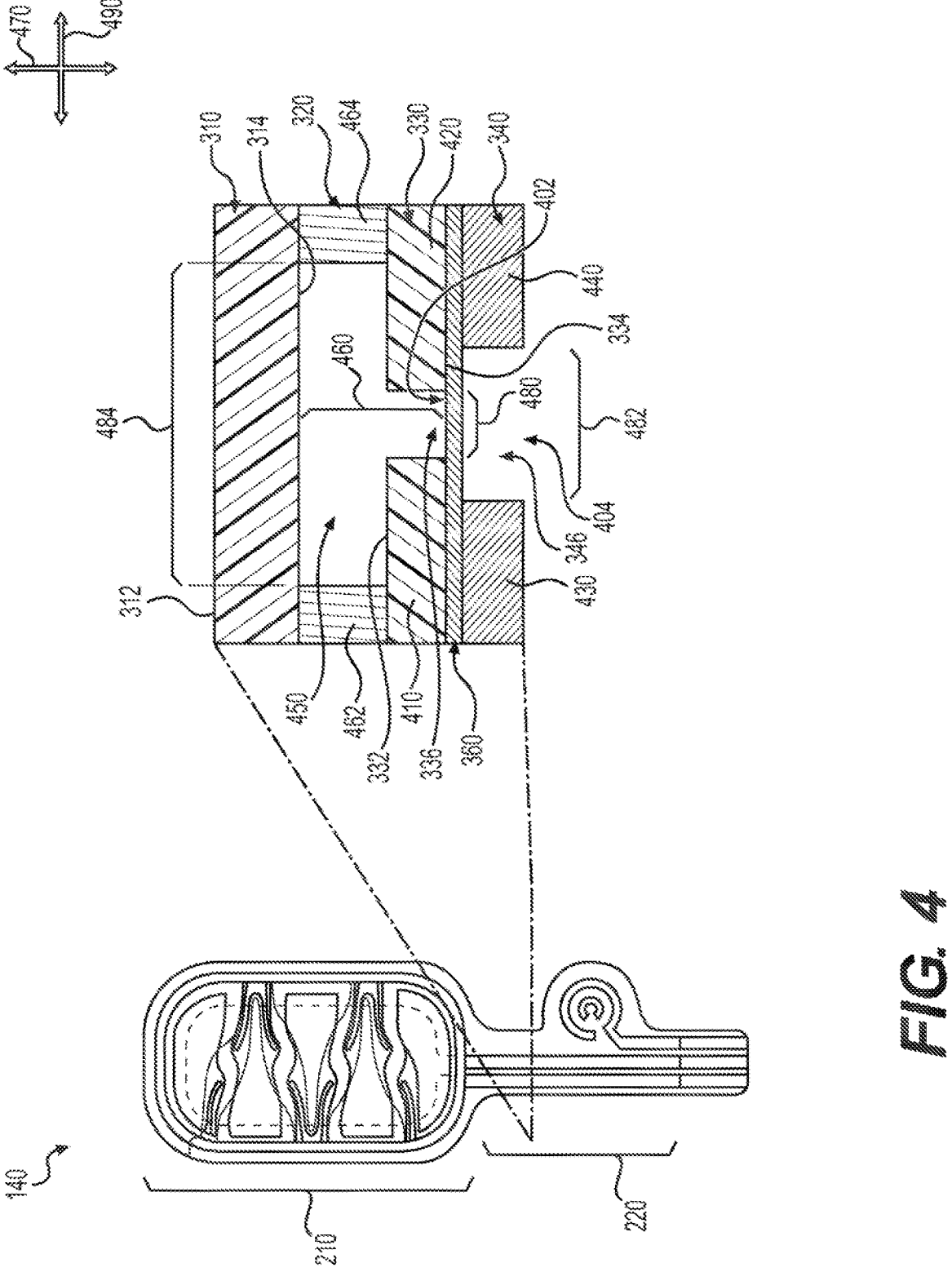
FIG. 4 is a schematic cross-sectional view of an embodiment of a sensor device.

Referring to FIG. 4, a top-down view of device 140 (as assembled) is depicted as well as a cross-sectional view of a portion of elongated portion 221. In the cross-sectional view, top substrate layer 310 is shown as an outermost layer, and is disposed directly above first adhesive layer 320 along a direction substantially aligned with a vertical axis 470. First adhesive layer 320 is located between top substrate layer 310 and bottom substrate layer 330. Furthermore, bottom substrate layer 330 is positioned between first adhesive layer 320 and second adhesive layer 340, as noted earlier. The cross-sectional view also illustrates first aperture 336 formed in bottom substrate layer 330, extending along a direction substantially aligned with a lateral axis 490, between a first bottom side portion 410 and a second bottom side portion 420. Furthermore, second aperture 346 can be seen formed in second adhesive layer 340, extending along a direction substantially aligned with a lateral axis 490, between a first adhesive side portion 430 and a second adhesive side portion 440.

As described above, in some embodiments, the size of first aperture 336 can differ from that of second aperture 346. In FIG. 4, a first width 480 of first aperture 336 is substantially smaller than a second width 482 of second aperture 346. In one embodiment, the horizontal cross-sectional surface area associated with first aperture 336 is smaller than that of second aperture 346. In other embodiments, the widths of each aperture can be substantially similar. In another embodiment, second width 482 may be smaller than first width 480. In some embodiments, due to the different sizes of each aperture, it can be seen that a portion of bottom outer surface 334 of bottom substrate layer 330 can provide an outermost surface of device 140. In other words, while second adhesive layer 340 provides a majority of the lower outermost surface of device 140, in some embodiments, because second aperture 346 is larger than first aperture 336, second aperture 346 can expose a portion of bottom substrate layer 330 from below.

In addition, as noted earlier, the inclusion of first adhesive layer 320 provides a space between the two substrate layers, forming a gap or channel 460 that has a height substantially similar to a thickness of first adhesive layer 320. Channel 460 can thus be located between top substrate layer 310 and bottom substrate layer 330, associated with the exposed region of first adhesive layer 320 (see FIG. 3). The cross-sectional view illustrates channel 460 extending between a first spacer side portion 462 and a second spacer side portion 464, along a direction substantially aligned with a lateral axis 490. Channel 460 has a third width 484 in FIG. 4. In some embodiments, the size of channel 460 can differ from that of either first aperture 336 or second aperture 346. In FIG. 4, first width 480 of first aperture 336 is substantially smaller than third width 484 of channel 460. Similarly, second width 482 of second aperture 346 is smaller than third width 484 of channel 460. In one embodiment, the horizontal cross-sectional surface area associated with channel 460 is smaller than that of either first aperture 336 or second aperture 346. In other embodiments, the width of an aperture can be substantially similar to the width of channel 460. In another embodiment, third width 484 may be smaller than either first width 480 or second width 482. In some embodiments, the relative sizing of channel 460, first aperture 336, and second aperture 346 can facilitate the flow of air through device 140, as will be described below.

In some embodiments, the "stacking" or positioning of channel 460 over an aperture (such as first aperture 336 or second aperture 346) can allow a continuous opening or space to be formed within device 140 in a direction substantially aligned with vertical axis 470. In other words, in some embodiments, a continuous shaft ("shaft") 450 comprising the volume of both a portion of channel 460 aligned directly above first aperture 336, as well as the volume of first aperture 336, can extend through device 140 in a substantially vertical direction, allowing fluid communication between channel 460 and first aperture 336. Shaft 450 can be bounded by the surfaces and sidewalls of portions of different layers.

In some embodiments, device 140 can include provisions for airflow to move through shaft 450 in a particular direction. In one embodiment, shaft 450 can lead to or include a valve opening 402. Valve opening 402 may comprise an opening or passageway formed in a lower surface of device 140. In FIG. 4, valve opening 402 is associated with a bottommost region of shaft 450. As noted above, in some embodiments, a portion of bottom substrate layer 330 can provide an outermost or lower surface of device 140. In some embodiments, valve opening 402 can be in fluid communication with or disposed adjacent to second aperture 346. Furthermore, second aperture 346 can also comprise an opening or passageway formed in a lower or outermost surface of device 140. In FIG. 4, second aperture 346 has a port opening 404, which can provide a kind of inlet for device 140.

However, as shown in FIG. 4, in some embodiments, cover portion 360 can be disposed between a portion of bottom substrate layer 330 and second adhesive layer 340. In some embodiments, cover portion 360 extends entirely across the space associated with valve opening 402, such that valve opening 402 is blocked or sealed by cover portion 360. In other words, in some embodiments, cover portion 360 can prevent or minimize communication of fluid from within shaft 450 into second aperture 346, or from the external environment and into shaft 450. In one embodiment, cover portion 360 creates a seal between valve opening 402 and second aperture 346. While cover portion 360 is shown extended across the entire width of elongated portion 221 in FIG. 4, it should be understood that cover portion 360 may have any width or size. In other words, cover portion 360 may be smaller in size in other embodiments, so long as its size is sufficient to fully cover valve opening 402.

In some embodiments, the conduit that provides passage to air or fluid through device 140 can extend through active portion 210 and into tail portion 220. For purposes of reference, it can be understood that conduit comprises both a "horizontal passageway" and shaft 450 (discussed above). The horizontal passageway can be in fluid communication with shaft 450 in some embodiments.

Figure 5:
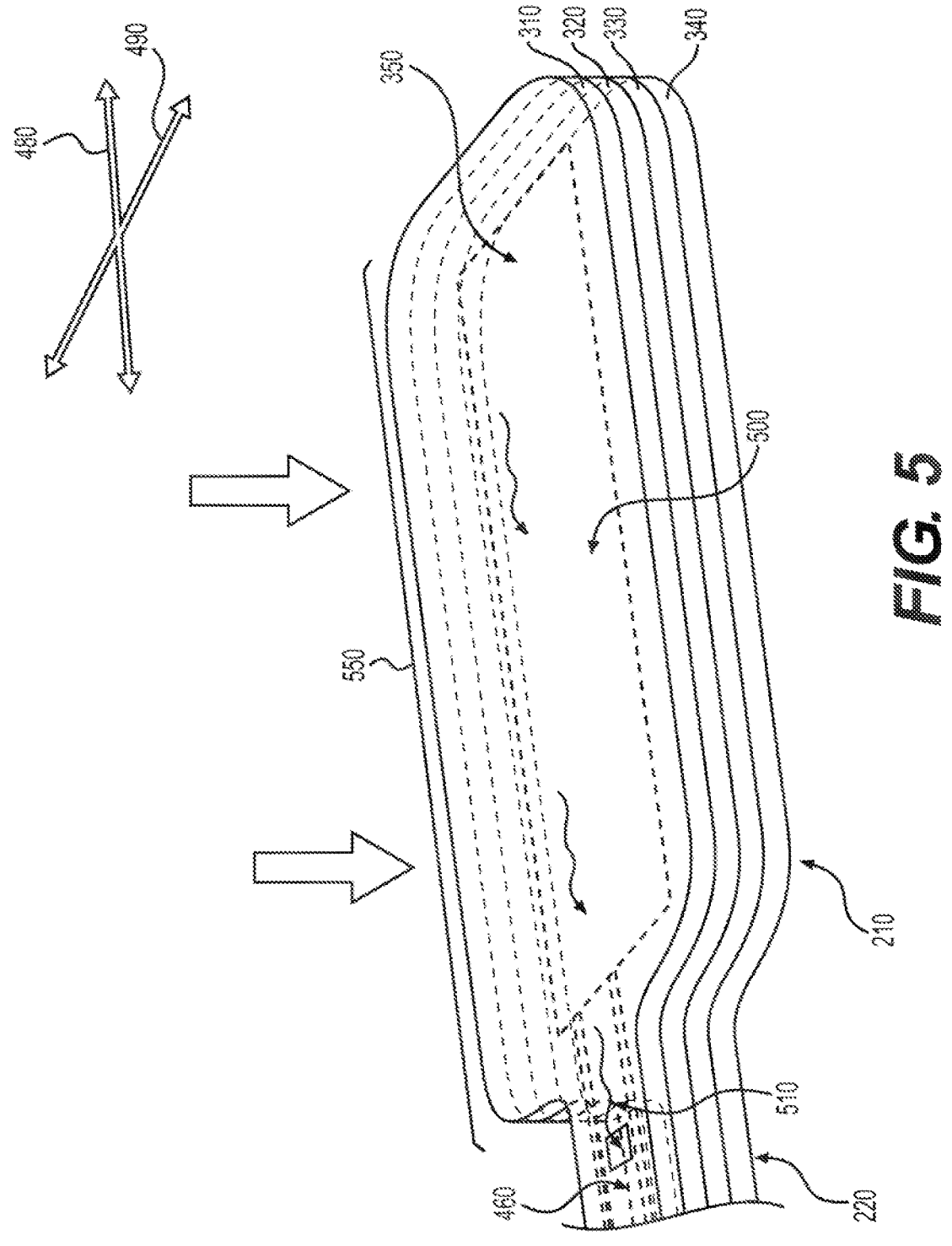
FIG. 5 is an isometric view of an embodiment of a flowpath through a portion of a sensor device.

Referring to FIG. 5, one embodiment of a horizontal passageway 550 in device 140 is depicted. Horizontal passageway 550 can extend from active portion 210 to tail portion 220 along a plane aligned with a longitudinal axis 480 in some embodiments. Furthermore, in some embodiments, horizontal passageway 550 can comprise the space or opening associated with the gap formed by the inclusion of first adhesive layer 320 between top substrate layer 310 and bottom substrate layer 330 (i.e., through exposed region 350 of first adhesive layer 320).

As noted above, in some embodiments, a force may be applied to active portion 210 (represented in FIG. 5 by two large arrows pointing downward). In some cases, air disposed within a chamber 500 bounded by the interior sidewalls of first adhesive layer 320 associated with active portion 210 can flow or otherwise move from within chamber 500. For example, when actuation occurs, top substrate layer 310 can be pushed inward toward bottom substrate layer 330. In one embodiment, this can lead to a decreased volume in chamber 500 in some embodiments, which can push or expel air away from chamber 500. In other words, whereas the chamber has a first volume in the neutral state, and a second volume in the actuated state, in some embodiments, the first volume of the chamber is greater than the second volume of the chamber. In some embodiments, air can move such that it flows out of active portion 210. In one embodiment, air can exit through an outlet 510. In some embodiments, outlet 510 comprises a passage or opening joining chamber 500 of active portion 210 with channel 460 of tail portion 220, allowing air to communicate between active portion 210 and tail portion 220. Once air flows into tail portion 220, air can be routed into other regions of the conduit in different embodiments.

Figure 6:
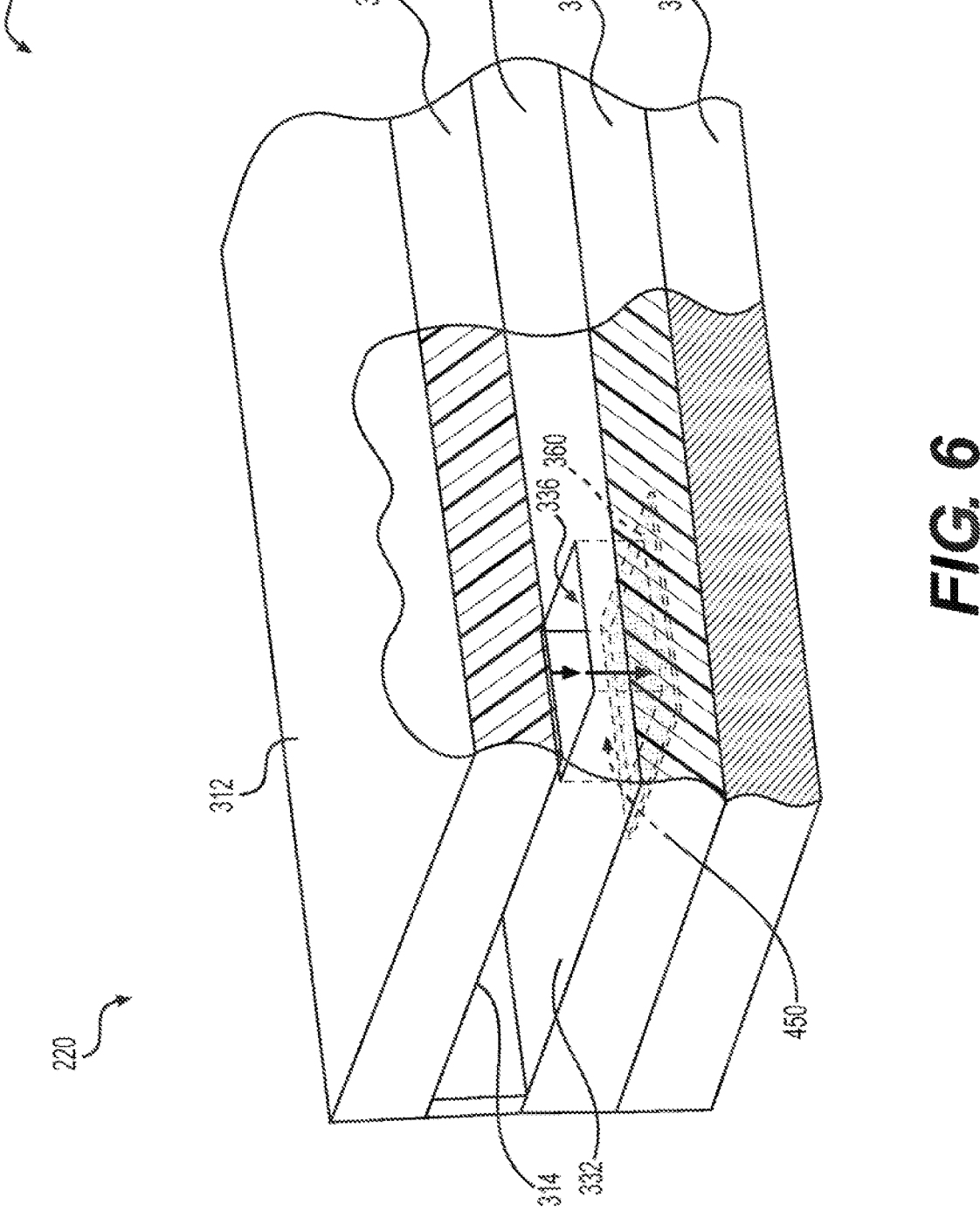
FIG. 6 is an isometric view of an embodiment of a flowpath through a portion of a sensor device.

Referring now to the cutaway view of tail portion 220 depicted in FIG. 6, it can be seen that in some embodiments, air can travel or move from the horizontal passageway (see FIG. 5) and into shaft 450 (described above in detail with respect to FIG. 4). Thus, in some embodiments, air can travel along a first flowpath through device 140 corresponding to the horizontal passageway (shown in FIG. 5), and continue to move along a second flowpath corresponding to the vertically oriented shaft 450 as shown in FIG. 6. In other words, in different embodiments, air can move in a substantially continuous manner from the active portion and into the tail portion when compression of the active portion occurs.

Figure 7:
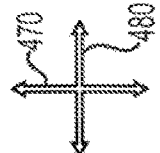
FIG. 7 is an isometric view of an embodiment of flowpaths through a portion of a sensor device.

One embodiment of the flowpaths for air provided by a conduit 700 in device 140 is illustrated in the schematic cross section of FIG. 7. In FIG. 7, active portion 210 is joined to tail portion 220. Chamber 500 extends through active portion 210 in the space or cavity that occurs between top substrate layer 310 and bottom substrate layer 330 when device 140 is in the uncompressed or neutral state. Arrows indicating the flowpaths are shown in a region where the thickness of active portion 210 is undergoing a deformation, and is in the process of transitioning from the neutral (uncompressed) state to the actuated (compressed) state. In other words, top substrate layer 310 may be pushed downward and decrease the volume of chamber 500 as device 140 is actuated or a force is applied on active portion 210. In some embodiments, as noted earlier, air can be pushed or expelled outward toward tail portion 220 via outlet 510. In some embodiments, airflow continues along the horizontal flowpath and can reach the region of device 140 that is associated with shaft 450. While in different embodiments some air can continue onward in a direction substantially aligned with longitudinal axis 480 and into a portion of channel 460 that is disposed closer to connector portion (see FIG. 2), it can be seen that some, most, or substantially all of the air moving from active portion 210 can be routed into the vertical flowpath associated with shaft 450 in some embodiments.

In some embodiments, as air moves in a substantially downward direction from channel 460 and into first aperture 336, some of the air can contact an inwardly facing surface 710 of cover portion 360. As air flow increases, the pressure exerted by the air against inwardly facing surface 710 of cover portion 360 can increase. In some embodiments, if there is a sufficient amount of air pressure, cover portion 360 may undergo an elastic deformation, as will be discussed further below with respect to FIGS. 9-12. In other words, in some embodiments, the elastic membrane comprising cover portion 360 can deform in response to an increased air pressure in shaft 450.

Figure 8:
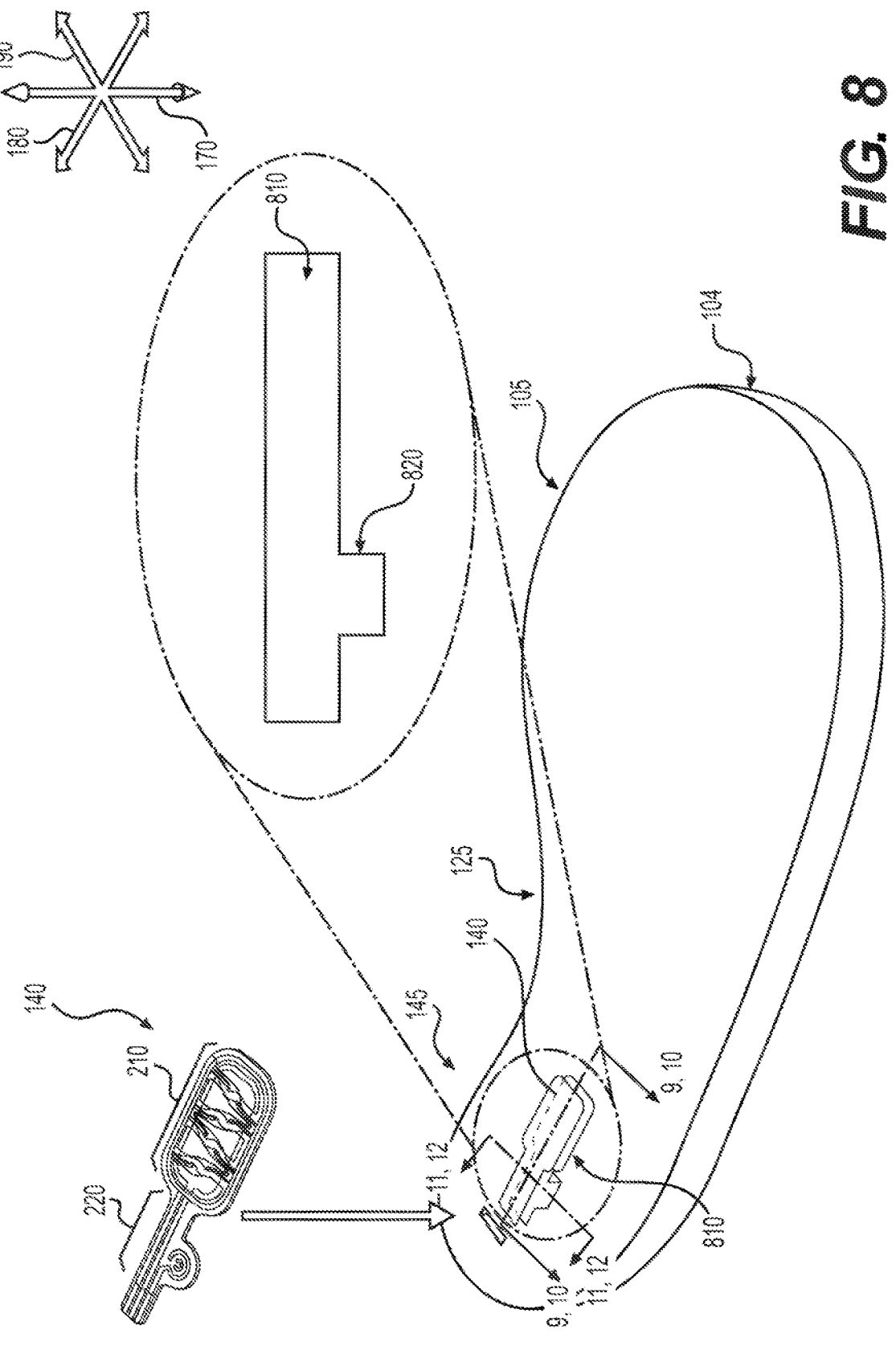
FIG. 8 is an isometric view of an embodiment of a sensor device and a sole structure.

Furthermore, as described above with respect to FIG. 1, in different embodiments, device 140 can be utilized within a sole structure of an article of footwear. Referring now to FIG. 8, sole structure 104 is depicted. In different embodiments, sole structure 104 can include provisions for receiving, connecting, or otherwise incorporating device 140. In FIG. 8, sole structure 104 is shown with a cavity 810 formed within heel region 145. In some embodiments, cavity 810 can be configured to receive device 140. In one embodiment, cavity 810 can be sized and dimensioned to allow device 140 to be inserted into and/or snugly fitted into cavity 810. In one embodiment, cavity 810 may include a height sufficient to completely receive or enclose the sides or thickness of device 140, such that the outermost top surface of device 140 is flush with the remainder of sole structure 104. In some embodiments, a substantial entirety of device 140 can be received within sole structure 104. However, in other embodiments, only a portion of device 140 may be inserted within sole structure 104.

In different embodiments, cavity 810 can include provisions for accommodating changes in the size of cover portion and/or deformation associated with the cover portion (as will be described further below). In the magnified side view of FIG. 8, an embodiment of cavity 810 is shown in greater deal. It can be seen that in some embodiments, cavity 810 can include a kind of "cathedral floor" or recess 820. In some embodiments, recess 820 can be positioned to correspond with the valve opening of device 140 (see FIG. 4) when device 140 is installed in cavity 810 of sole structure 104. In one embodiment, recess 820 is sized and dimensioned to permit a free expansion of the cover portion when device 140 is experiencing maximum air pressure in the shaft, as will be discussed with respect to FIGS. 9-12.

Figures 9, 10:
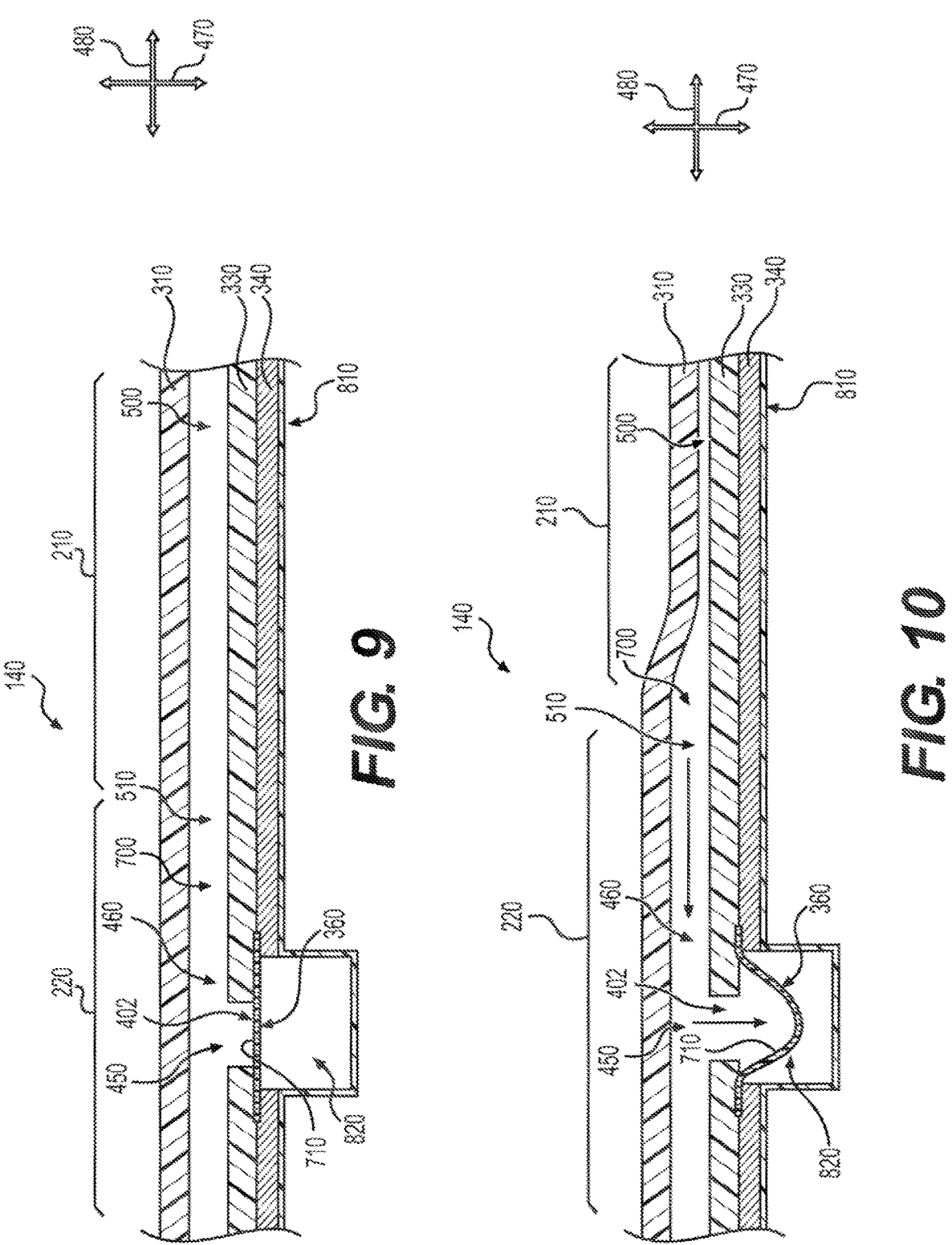
FIG. 9 is a longitudinal cross-sectional view of an embodiment of a sensor device disposed in a sole structure.
FIG. 10 is a longitudinal cross-sectional view of an embodiment of a sensor device disposed in a sole structure.

Referring now to FIG. 9, a schematic of a longitudinal cross-section taken along longitudinal axis 180 in FIG. 8 of device 140 in the neutral state is depicted, and in FIG. 10 a schematic of a longitudinal cross-section taken along longitudinal axis 180 in FIG. 8 of device 140 in the actuated state is depicted. In FIG. 9, it can be seen that in the neutral state, air pressure is generally evenly distributed throughout the different regions of conduit 700. In some embodiments, the air pressure associated with shaft 450 is minimal in the neutral state. Cover portion 360, disposed adjacent to and covering valve opening 402, is in a flattened configuration. Inwardly facing surface 710 of cover portion 360 can be understood to have a first surface area in the neutral state.

When a force is applied to device 140, the air pressure can be redistributed in some cases. In some embodiments, air pressure associated with shaft 450 can increase. As the airflow exerts an increasingly greater force against inwardly facing surface 710, it can be seen that in some embodiments, cover portion 360 can deform. In one embodiment, shown in FIG. 10, cover portion 360 can stretch and extend outward. Initially, cover portion 360 can bulge downward into the space associated with second aperture 346. As the air pressure increases, the degree of deformation of cover portion 360 can also increase. In some embodiments, cover portion 360 may expand or balloon downward beyond the periphery of device 140, such that inwardly facing surface 710 forms a substantially concave surface. Furthermore, inwardly facing surface 710 of cover portion 360 can be understood to have a second surface area in the actuated state that is substantially greater than the first surface area of cover portion 360 in the neutral state.

Thus, in different embodiments, when device 140 is installed in sole structure 104, as shown in FIGS. 9 and 10, cover portion 360 can deform, expand, and/or extend into the space associated with recess 820 of cavity 810. In some embodiments, recess 820 can be configured to receive and/or accommodate the changing shape and size of cover portion 360. In other words, during use of device 140, as pressure is applied on device 140 by a foot (for example), air can be routed or moved through device 140 along the flowpaths described herein.

Figures 11, 12:
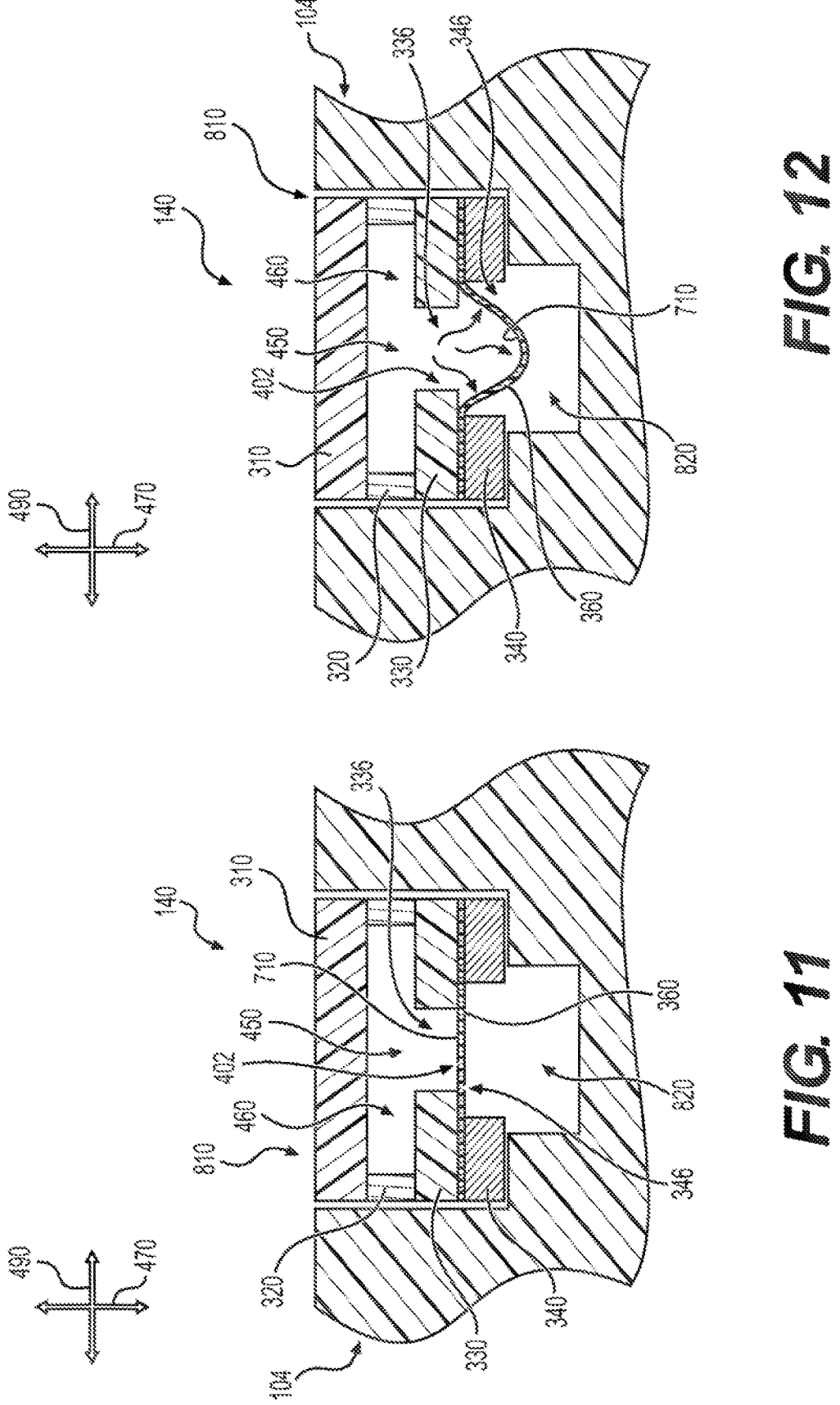
FIG. 11 is a lateral cross-sectional view of an embodiment of a sensor device disposed in a sole structure.
FIG. 12 is a lateral cross-sectional view of an embodiment of a sensor device disposed in a sole structure.

For purposes of clarity, another view of the deformation process of cover portion 360 is depicted in the lateral cross-sections of FIGS. 11 and 12. In FIG. 11, a longitudinal cross-section taken along lateral axis 490 of FIG. 8 of device 140 in the neutral state is depicted, and in FIG. 12 a schematic of a longitudinal cross-section taken along lateral axis 490 of FIG. 8 of device 140 in the actuated state is depicted. As noted earlier, in the neutral state, air pressure is generally evenly distributed throughout the different regions of the conduit. In some embodiments, the air pressure associated with shaft 450 is minimal in the neutral state. Cover portion 360, disposed adjacent to and covering valve opening 402, is in a flattened configuration. When normal forces are applied against the active portion of device 140, the air pressure can be redistributed in some embodiments. In some embodiments, air pressure associated with shaft 450 can increase.

As airflow exerts an increasingly greater force against inwardly facing surface 710, it can be seen that in some embodiments, cover portion 360 can deform. In one embodiment, shown in FIG. 12, cover portion 360 can stretch and extend outward. Initially, cover portion 360 can bulge downward into the space associated with second aperture 346. As the air pressure exerted against inwardly facing surface 710 of cover portion 360 increases, the degree of deformation of cover portion 360 can also increase. In some embodiments, cover portion 360 may expand or balloon downward beyond the periphery of device 140, such that inwardly facing surface 710 forms a substantially concave surface.

Furthermore, as noted above, in different embodiments, when device 140 is installed in sole structure 104, as shown in FIGS. 11 and 12, cover portion 360 can deform, expand, and/or extend into the space associated with recess 820 of cavity 810.

Thus, in some embodiments, it can be understood that cover portion 360 can comprise an expandable membrane, forming a sealed area over valve opening 402 of shaft 450. The inclusion of an elastic material can provide device 140 with an adjustable mechanism to receive the air that may be displaced when a force is applied to device 140. In some embodiments, the use of cover portion 360 can form a substantially water-resistant or waterproof seal and protect the interior of device 140 from external particles or other materials that may potentially affect the use of device 140 in an undesirable manner. Furthermore, an elastic membrane extending across the opening formed in the lower surface of device 140 may help alleviate "pancaking" of the sensor by providing a restoring force in device 140. In other words, because cover portion 360 is made of an elastic material, once the force being applied on the active portion is released and the chamber space is restored, in some embodiments, cover portion 360 can revert to a collapsed or flattened configuration, pushing the air back into the flowpath in the opposite direction, and facilitating the expansion of the chamber to its original shape and/or size. This process is depicted schematically in the longitudinal cross sections of FIGS. 13 and 14.

Figures 13, 14:
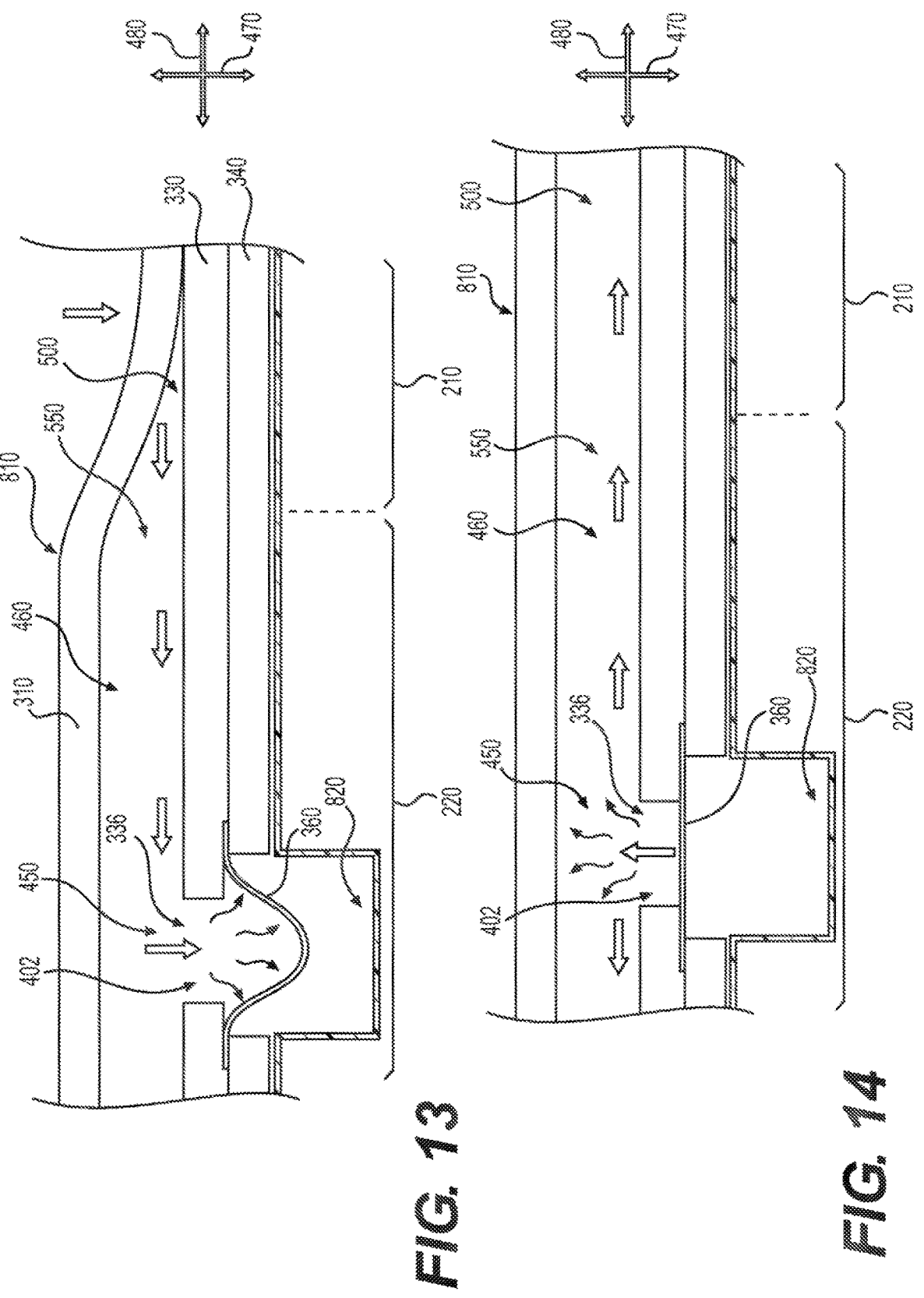
FIG. 13 is a longitudinal cross-sectional view of an embodiment of a sensor device disposed in a sole structure.
FIG. 14 is a longitudinal cross-sectional view of an embodiment of a sensor device disposed in a sole structure.

In FIGS. 13 and 14, another embodiment of a flowpath for air provided by a conduit in device 140 when the force is removed is illustrated. In FIG. 13, arrows indicating the flowpath during the actuation state are shown. As active portion 210 undergoes a deformation, top substrate layer 310 is pushed downward, decreasing the volume of chamber 500. As described earlier, in some embodiments, some, most, or substantially all of the air moving from active portion 210 can be routed along horizontal passageway 550 into the vertical flowpath associated with shaft 450. However, when the force is removed, active portion 210 and chamber 500 can return to their configuration in the uncompressed or neutral state.

In some embodiments, as the force is removed, air can move away from shaft 450 in a substantially upward direction from first aperture 336 into channel 460. Thus, in some embodiments, at least some of the air that was previously pressing against cover portion 360 can move away from cover portion 360 and toward chamber 500. In some embodiments, as air continues to move away from shaft 450 and disperses into and through channel 460, chamber 500 can expand as air pressure increases in chamber 500. In some embodiments, cover portion 360 may elastically return to a flattened configuration. In other words, in some embodiments, the elastic membrane comprising cover portion 360 can collapse back to its configuration prior to the deformation in response to a decrease in air pressure in shaft 450.

Figures 15, 16:
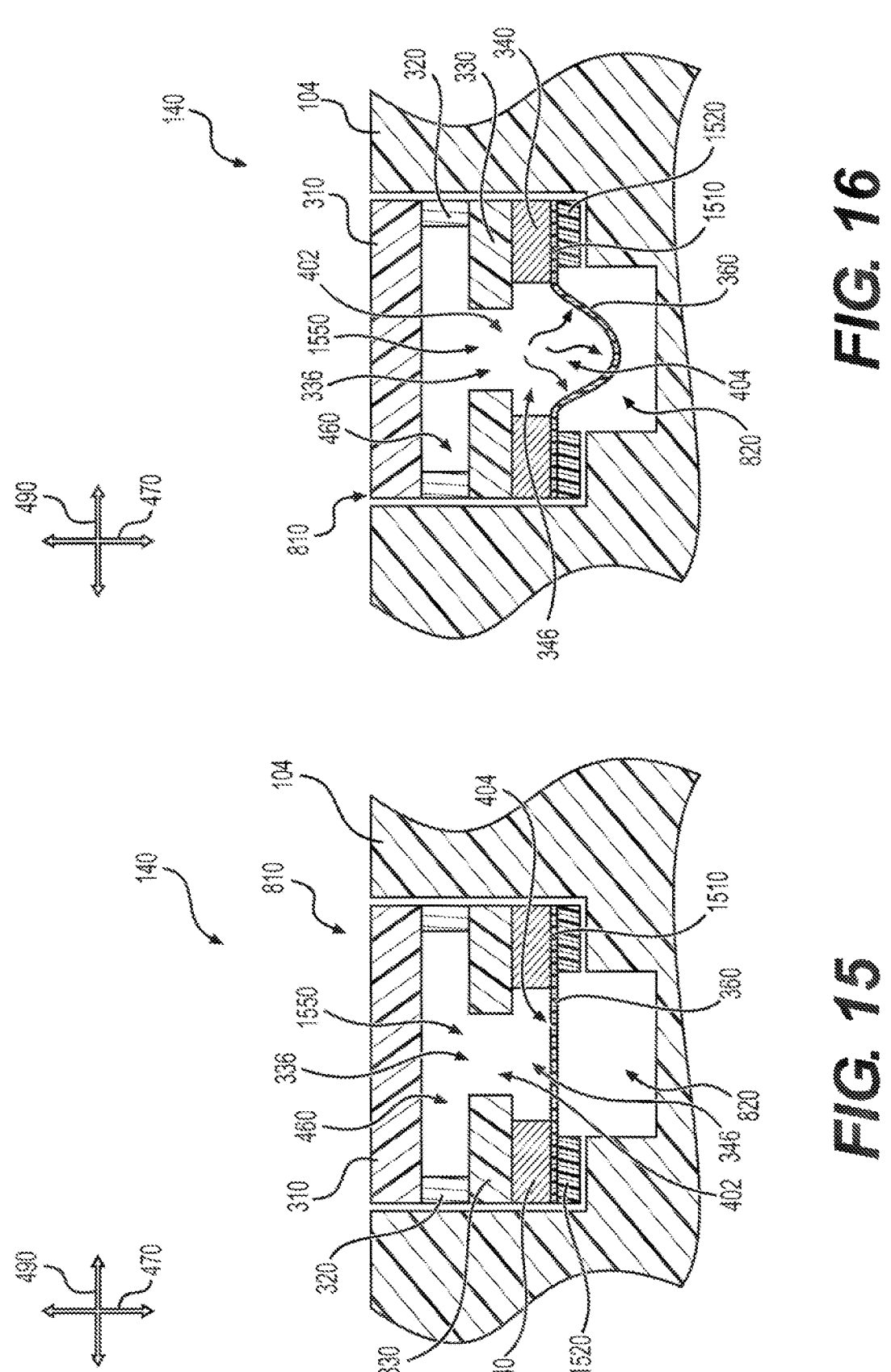
FIG. 15 is a lateral cross-sectional view of an embodiment of a sensor device with a cover portion and a securing layer disposed in a sole structure.
FIG. 16 is a lateral cross-sectional view of an embodiment of a sensor device with a cover portion and a securing layer disposed in a sole structure.

In different embodiments, the placement of cover portion 360 between bottom substrate layer 330 and second adhesive layer 340 allows cover portion 360 to be secured through the adhesive bond formed between the two layers. However, in other embodiments, a cover portion can be disposed along other regions or layers of device 140. For example, in some embodiments, cover portion 360 can be placed adjacent to port opening 404, on an outermost surface of second adhesive layer 340, referred to herein as an outer adhesive surface 1510. Referring to FIGS. 15 and 16, an alternative embodiment is depicted where cover portion 360 is attached to outer adhesive surface 1510. In FIGS. 15 and 16, a shaft 1550 is depicted extending in a substantially vertical direction, from channel 460, into first aperture 336, through valve opening 402, and into second aperture 346. In other words, in some embodiments, the "stacking" or positioning of channel 460 over an aperture (such as first aperture 336 or second aperture 346) can allow a continuous opening or space to be formed within device 140 in a direction substantially aligned with vertical axis 470 that is larger than shaft 450 described previously. In other words, in some embodiments, shaft 1550 comprising the volume of a portion of the channel aligned directly above first aperture 336, the volume of first aperture 336, as well as the volume of second aperture 346, can extend through device 140 in a substantially vertical direction, allowing fluid communication between channel 460, first aperture 336, and second aperture 346. Shaft 1550 can be bounded by the surfaces and sidewalls of portions of different layers.

In addition, in some embodiments, device 140 may include additional provisions for securing cover portion 360 on device 140. In one embodiment, as shown in FIGS. 15 and 16, cover portion 360 can be disposed between a portion of second adhesive layer 340 and a securing layer 1520. In other embodiments, device 140 may not include securing layer 1520, and cover portion 360 may be secured to second adhesive layer 340 through other means. For example, cover portion 360 may include an adhesive along one side of the cover portion that bonds cover portion 360 to outer adhesive surface 1510 of second adhesive layer 340.

In addition, in some embodiments, cover portion 360 extends entirely across the space associated with port opening 404, such that port opening 404 is blocked or sealed by cover portion 360. In other words, in some embodiments, cover portion 360 can prevent or minimize communication of fluid from within shaft 1550 out of device 140, or from the external environment and into shaft 1550. In one embodiment, cover portion 360 creates a seal between port opening 404 and the external environment. While cover portion 360 is shown extending across the entire width of elongated portion 221 in FIGS. 15 and 16, it should be understood that cover portion 360 may have any width or size. In other words, cover portion 360 may be smaller in size in other embodiments, so long as its size is sufficient to fully cover port opening 404.

In different embodiments, the horizontal passageway described herein can provide a first flowpath through device 140, and the shaft as described with respect to FIGS. 15 and 16 can provide a second flowpath through device 140. Thus, in some embodiments, the air pressure can exert a force against cover portion 360 when cover portion 360 is located against outer adhesive surface 1510. In FIGS. 15 and 16, the expansion or deformation process of cover portion 360 as described earlier is shown. However, in FIG. 15, it can be seen that cover portion 360 expands from a flattened configuration as aligned with port opening 404 rather than valve opening 402.

In addition, in different embodiments, device 140 can include provisions for securing cover portion 360 to second adhesive layer 340. For example, in some cases, though adhesive may be applied on cover portion 360, the bond can be improved by a securing layer that is wrapped around the cover portion. In some embodiments, a securing layer can increase the stability of the cover portion when shearing forces within the footwear are exerted on the cover portion.

Figures 17, 18:
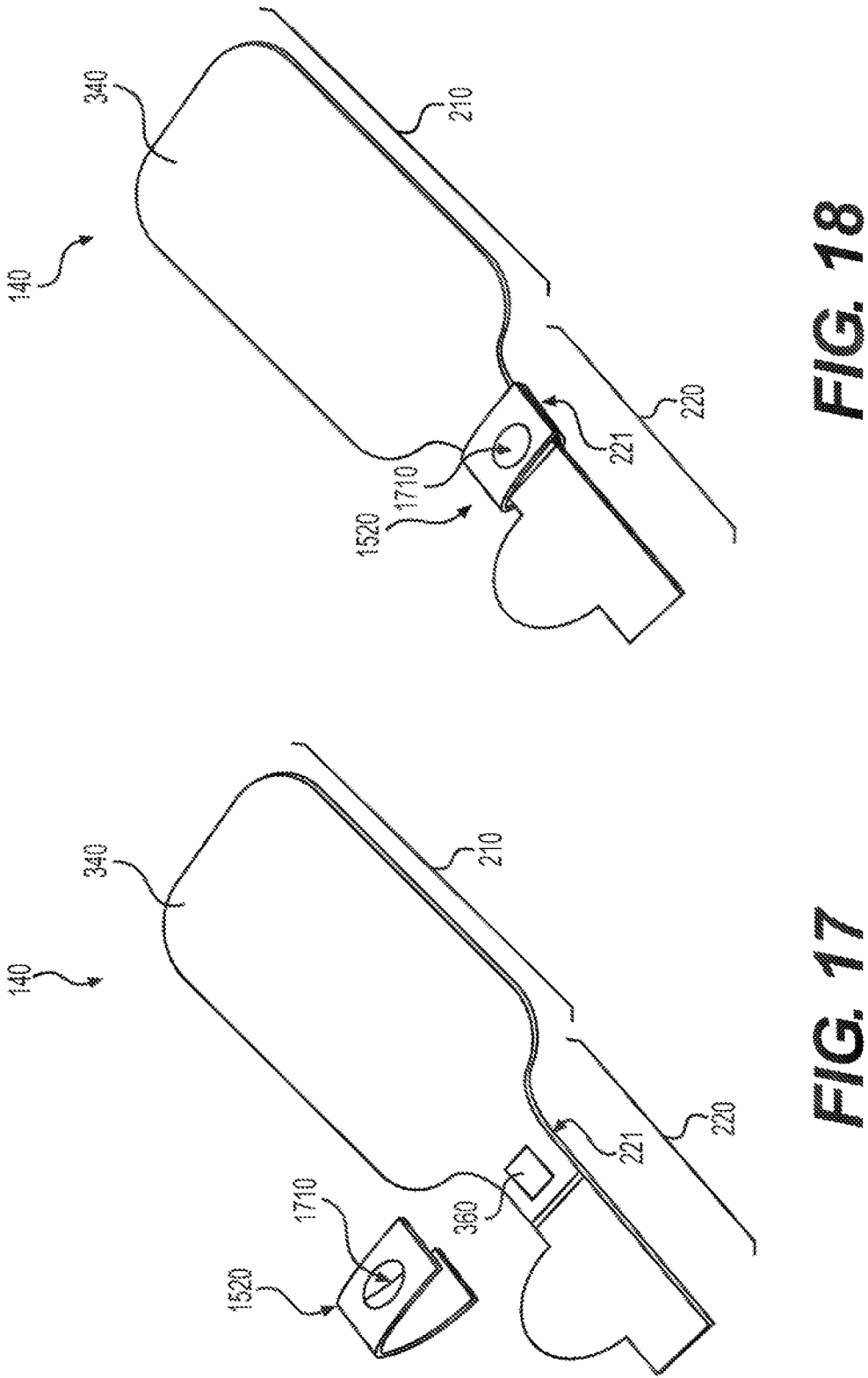
FIG. 17 is an isometric view of a sensor device with a securing layer.
FIG. 18 is an isometric view of a sensor device with a securing layer.

As an example, FIGS. 17 and 18 depict the attachment of securing layer 1520 around elongated portion 221. In FIG. 17, a folded sheet of material comprising securing layer 1520 is shown adjacent to device 140. In FIG. 18, securing layer 1520 has been arranged around elongated portion 221 and bonded to the outermost surface of elongated portion 221. It can be seen that securing layer 1520 also includes a third aperture 1710. When securing layer 1520 is positioned on device 140 and substantially surrounds elongated portion 221, third aperture 1710 can align with the port opening and cover portion 360. In other words, third aperture 1710 can be sized and dimensioned to surround and bound the port opening such that the region of cover portion 360 that extends across the port opening remains free and exposed. Thus, cover portion 360 can continue to expand and/or deform as described herein after securing layer 1520 has been joined to device 140.

In some embodiments, securing layer 1520 can comprise various materials. In one embodiment, securing layer 1520 comprises a polyimide tape with a hole (i.e., third aperture 1710) that is wrapped around device 140 and across a portion of cover portion 360. In other embodiments, securing layer 1520 can comprise any type of tape or film known in the art for use with electronics or other instruments.

Figure 19:
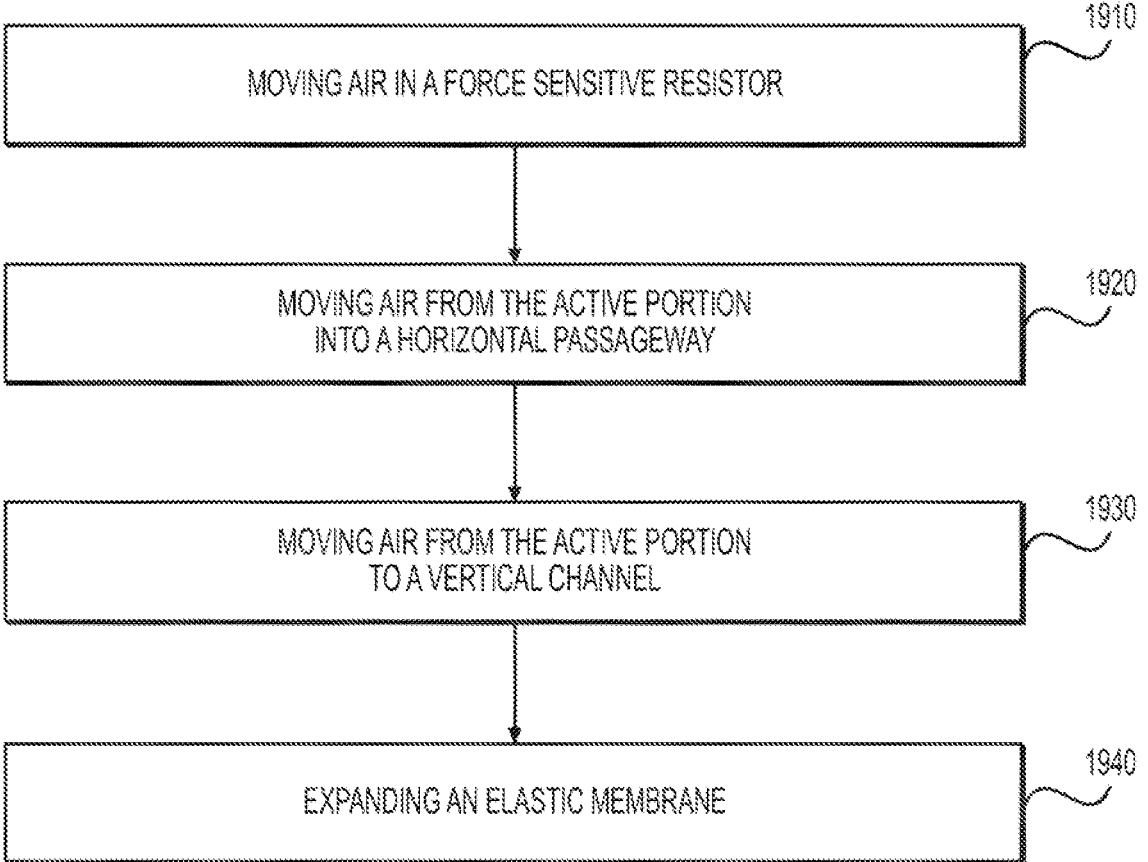
FIG. 19 is a flow chart depicting a method of moving air in a sensor device.

Thus, in different embodiments, the flowpaths described herein can be utilized to move air through the sensor device in different ways. For purposes of illustration, FIG. 19 provides a flow chart depicting one method of moving air through a sensor device (labeled as 1910), where the sensor device includes a top substrate layer, a first adhesive layer, and a bottom substrate layer, as well as an active portion and a tail portion. In one embodiment, the method includes a first step 1920 comprising moving air from the active portion into a horizontal passageway formed in the sensor device when the active portion is compressed. In some embodiments, a second step 1930 comprises moving air from the active portion to a vertical channel disposed in the bottom substrate layer in the tail portion. Furthermore, in some embodiments, a third step 1940 can comprise expanding an elastic membrane that is exposed to increased air pressure.

In other embodiments, the method can further include returning air to a chamber formed in the active portion when the active portion is no longer compressed. In addition, in some embodiments, first step 1920 of moving air from the active portion into the horizontal passageway can further comprise moving air from a chamber that is formed between the top substrate layer and the bottom substrate layer within the active portion and into a channel that is formed in the tail portion. In one embodiment, the method may also include contracting the elastic membrane when the air returns to the chamber in the active portion. Furthermore, in some embodiments, third step 1940 comprising expanding the elastic membrane may further include the elastic membrane expanding in a direction that is away from the tail portion and toward a cavity that is formed in a sole structure of an article of footwear.

In different embodiments, any of the components described herein could be disposed in any other portions of an article, including various regions of the upper and/or sole structure. In some cases, some component parts (such as the connector portion, etc.) could be disposed in one portion of an article and other component parts (such as the active portion, etc.) could be disposed in another, different, portion. The location of one or more component parts may be selected according to various factors including, but not limited to, size constraints, manufacturing constraints, aesthetic preferences, optimal design and functional placement, ease of removability or accessibility relative to other portions of the article, as well as possibly other factors.

It should be understood that the embodiments and features described herein are not limited to a particular user interface or application for operating a motorized tensioning device or a tensioning system. Furthermore, the embodiments here are intended to be exemplary, and other embodiments could incorporate any additional substrate layers or adhesive bonds. The type of FSR utilized in the footwear can be selected according to various factors including, ease of use, aesthetic preferences of the designer, software design costs, operating properties of the system, as well as possibly other factors. Furthermore, a variety of products, including apparel (e.g., shirts, pants, footwear), may incorporate an embodiment of the control device described herein, as well as other types of articles, such as bed coverings, table coverings, towels, flags, tents, sails, and parachutes, or articles with industrial purposes that include automotive and aerospace applications, filter materials, medical textiles, geotextiles, agrotextiles, and industrial apparel.

While various embodiments have been described, the description is intended to be exemplary, rather than limiting, and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

What is claimed is:

1. A system, comprising:
a force sensitive resistor, comprising:
a top substrate layer; and
a bottom substrate layer;
wherein the top substrate layer and the bottom substrate layer form an active portion, a tail portion, and a horizontal passageway operatively coupled between the active portion and the tail portion;
wherein the active portion is configured to compress in response to a force placed on the active portion;
wherein the tail portion forms a vertical channel leading to an opening; and
an elastic membrane secured over the opening; and
wherein the horizonal passageway and the vertical channel are configured to move air from the active portion to the horizontal passageway and the vertical channel when the active portion is compressed and thereby transition from a neutral state to an actuated state and return air to the active portion when the active portion is no longer compressed and thereby return to the neutral state.

2. The system of claim 1, wherein the elastic membrane is configured to relax when the air returns to the active portion.

3. The system of claim 1, wherein the active portion includes a chamber formed between the top substrate layer and the bottom substrate layer, and wherein the chamber has a first volume in the neutral state and a second volume in the actuated state, and wherein the first volume is greater than the second volume.

4. The system of claim 1, wherein an inwardly facing surface of the elastic membrane is substantially flat in the neutral state and wherein the inwardly facing surface of the elastic membrane is substantially concave in the actuated state.

5. The system of claim 1, wherein the force sensitive resistor transitions from the neutral state to the actuated state when a vertical force is applied to the force sensitive resistor, and wherein air pressure exerted against the elastic membrane is greater in the actuated state relative to the neutral state.

6. The system of claim 5, wherein the elastic membrane is configured to transition from an expanded configuration to a flattened configuration after the vertical force is removed.

7. The system of claim 6, further comprising a sole structure forming a recess sized to accommodate the elastic membrane when in the expanded configuration.

8. A system, comprising:
a force sensitive resistor, comprising:
a top substrate layer;
a bottom substrate layer;
wherein the top substrate layer and the bottom substrate layer form an active portion, a tail portion, and a horizontal passageway operatively coupled between the active portion and the tail portion;
wherein the active portion forms a chamber configured to compress in response to a force placed on the active portion;
wherein the tail portion forms a vertical channel leading to an opening; and
an elastic membrane secured over the opening; and
wherein the horizonal passageway and the vertical channel are configured to move air from the active portion to the horizontal passageway and the vertical channel when the active portion is compressed and thereby transition from a neutral state to an actuated state and return air to the active portion when the active portion is no longer compressed and thereby return to the neutral state.

9. The system of claim 8, wherein the elastic membrane is configured to relax when the air returns to the chamber in the active portion.

10. The system of claim 8, wherein an inwardly facing surface of the elastic membrane is substantially flat in the neutral state and wherein the inwardly facing surface of the elastic membrane is substantially concave in the actuated state.

11. The system of claim 8, wherein the force sensitive resistor transitions from the neutral state to the actuated state when a vertical force is applied to the force sensitive resistor, and wherein air pressure exerted against the elastic membrane is greater in the actuated state relative to the neutral state.

12. The system of claim 11, wherein the elastic membrane is configured to transition from an expanded configuration to a flattened configuration after the vertical force is removed.

13. The system of claim 12, further comprising a sole structure forming a recess sized to accommodate the elastic membrane when in the expanded configuration.

14. A system, comprising:
a force sensitive resistor, comprising:
a top substrate layer;
a bottom substrate layer;
wherein the top substrate layer and the bottom substrate layer form an active portion, a tail portion, and a horizontal passageway operatively coupled between the active portion and the tail portion;
wherein the active portion is configured to compress in response to a force placed on the active portion;
wherein the tail portion forms a vertical channel leading to an opening; and an elastic membrane secured over the opening; and
wherein the horizonal passageway and the vertical channel are configured to move air from the active portion to the horizontal passageway and the vertical channel when the active portion is compressed and thereby transition from a neutral state to an actuated state and return air to the active portion when the active portion is no longer compressed and thereby return to the neutral state.

15. The system of claim 14, wherein the elastic membrane is configured to relax when the air returns to the active portion.

16. The system of claim 14, wherein the active portion includes a chamber formed between the top substrate layer and the bottom substrate layer, and wherein the chamber has a first volume in the neutral state and a second volume in the actuated state, and wherein the first volume is greater than the second volume.

17. The system of claim 14, wherein an inwardly facing surface of the elastic membrane is substantially flat in the neutral state and wherein the inwardly facing surface of the elastic membrane is substantially concave in the actuated state.

18. The system of claim 14, wherein the force sensitive resistor transitions from the neutral state to the actuated state when a vertical force is applied to the force sensitive resistor, and wherein air pressure exerted against the elastic membrane is greater in the actuated state relative to the neutral state.

19. The system of claim 18, wherein the elastic membrane is configured to transition from an expanded configuration to a flattened configuration after the vertical force is removed.

20. The system of claim 19, further comprising a sole structure forming a recess sized to accommodate the elastic membrane when in the expanded configuration.

\* \* \* \* \*